US005774450A

United States Patent [19]

Harada et al.

[11] Patent Number: 5,774,450

[45] Date of Patent: Jun. 30, 1998

[54] METHOD OF TRANSMITTING ORTHOGONAL FREQUENCY DIVISION MULTIPLEXING SIGNAL AND RECEIVER THEREOF

[75] Inventors: Yasuo Harada, Kobe; Tomohiro Kimura, Kawachinagano; Hiroshi Oue, Neyagawa; Yasuo Nagaishi, Ikoma; Hiroshi Hayashino, Takarazuka; Yasuhiro Uno, Katano, all of Japan

[73] Assignee: Matsushita Electric Industrial Co., Ltd., Osaka, Japan

[21] Appl. No.: 580,887

[22] Filed: Dec. 29, 1995

[30] Foreign Application Priority Data

| | | | |
|---|---|---|---|
| Jan. 10, 1995 | [JP] | Japan | 7-002053 |
| Jan. 10, 1995 | [JP] | Japan | 7-002054 |

[51] Int. Cl.$^{6}$ .............................. H04J 11/00; H04L 27/34

[52] U.S. Cl. .......................... 370/206; 370/208; 370/210; 370/515; 375/368

[58] Field of Search ............................ 370/203, 206–208, 370/210, 514, 515; 375/261, 298, 344, 345, 368

[56] References Cited

U.S. PATENT DOCUMENTS

| | | | |
|---|---|---|---|
| 5,228,025 | 7/1993 | Le Floch et al. | 370/206 |
| 5,406,551 | 4/1995 | Saito et al. . | |
| 5,596,582 | 1/1997 | Sato et al. | 370/203 |
| 5,682,376 | 10/1997 | Hayashino et al. | 370/206 |

FOREIGN PATENT DOCUMENTS

| | | | |
|---|---|---|---|
| 5-167633 | 7/1993 | Japan . | |
| 5-219021 | 8/1993 | Japan . | |
| 408251135 | 9/1996 | Japan | H04J 11/00 |

OTHER PUBLICATIONS

Nikkei Electronics, "*Next Generation Home Service Exceeds Television*", No. 574, pp. 101 to 124, Feb. 15, 1993.

Masanori Saito in NHK Science and Technical Research Laboratories, "*OFDM System and Its Development*", pp. 1 to 15 in materials of EIAJ Technical Seminar, Sep. 14, 1994.

*Primary Examiner*—Marvin Marcelo

*Attorney, Agent, or Firm*—Wenderoth, Lind & Ponack

[57] ABSTRACT

An orthogonal frequency division multiplexing signal transmitted from the transmitting end to the receiving end intermittently includes a particular symbol S0 having a predetermined particular pattern in addition to a symbol Sm including data to be transmitted. At the receiving end, the variation in the receiving level and/or the variation in the frequency band of a received signal are detected and corrected on the basis of the received particular symbol S0. Since the particular symbol S0 has a particular pattern, the variation in the level and/or the variation in the frequency are strongly correlated with the variation in the receiving level and/or the variation in the frequency band of the received signal. Consequently, the variation in the receiving level and/or the variation in the frequency band of the received signal can be accurately detected from the particular symbol S0 and consequently high-precision correction can be made.

16 Claims, 12 Drawing Sheets

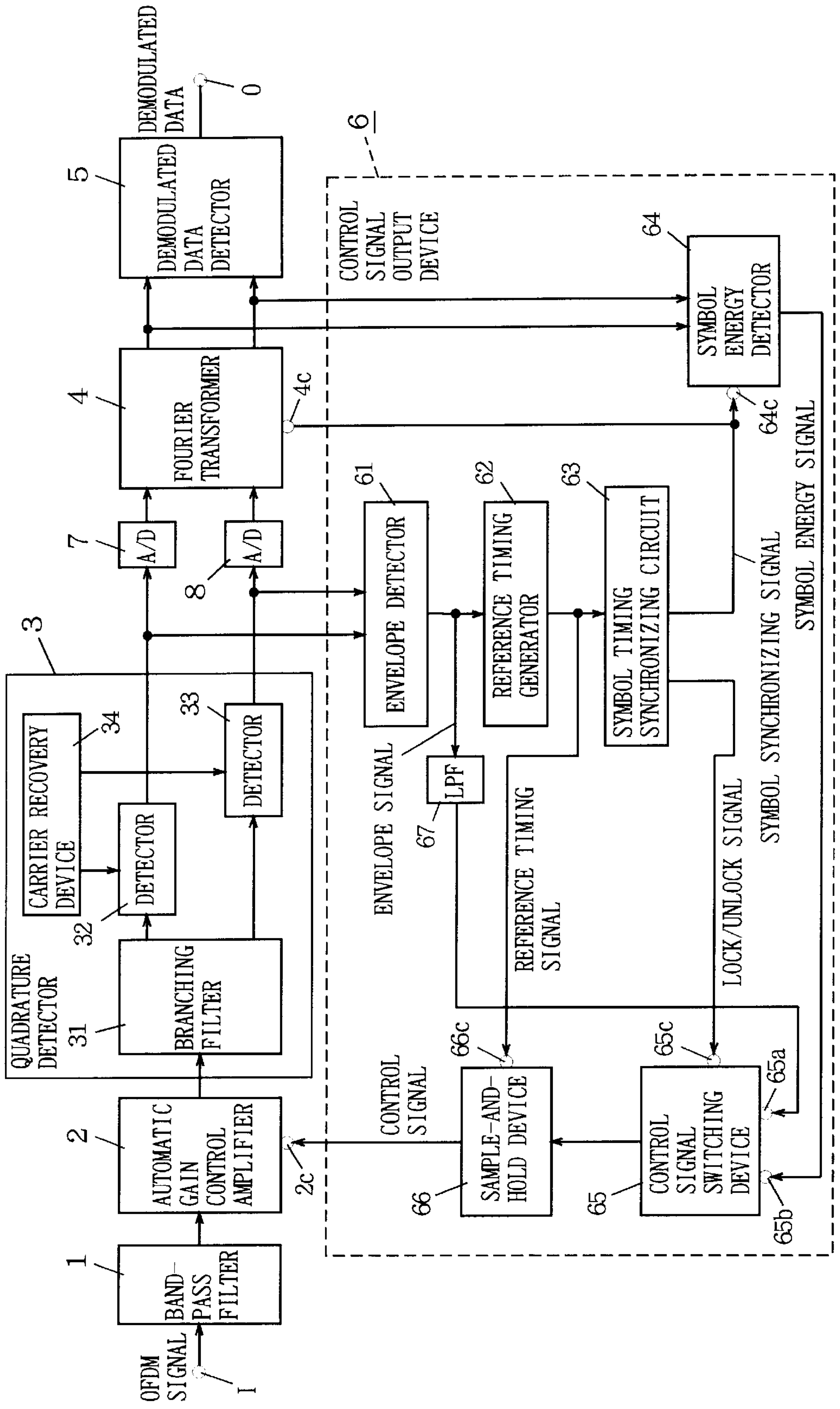
F I G. 2

F I G. 5
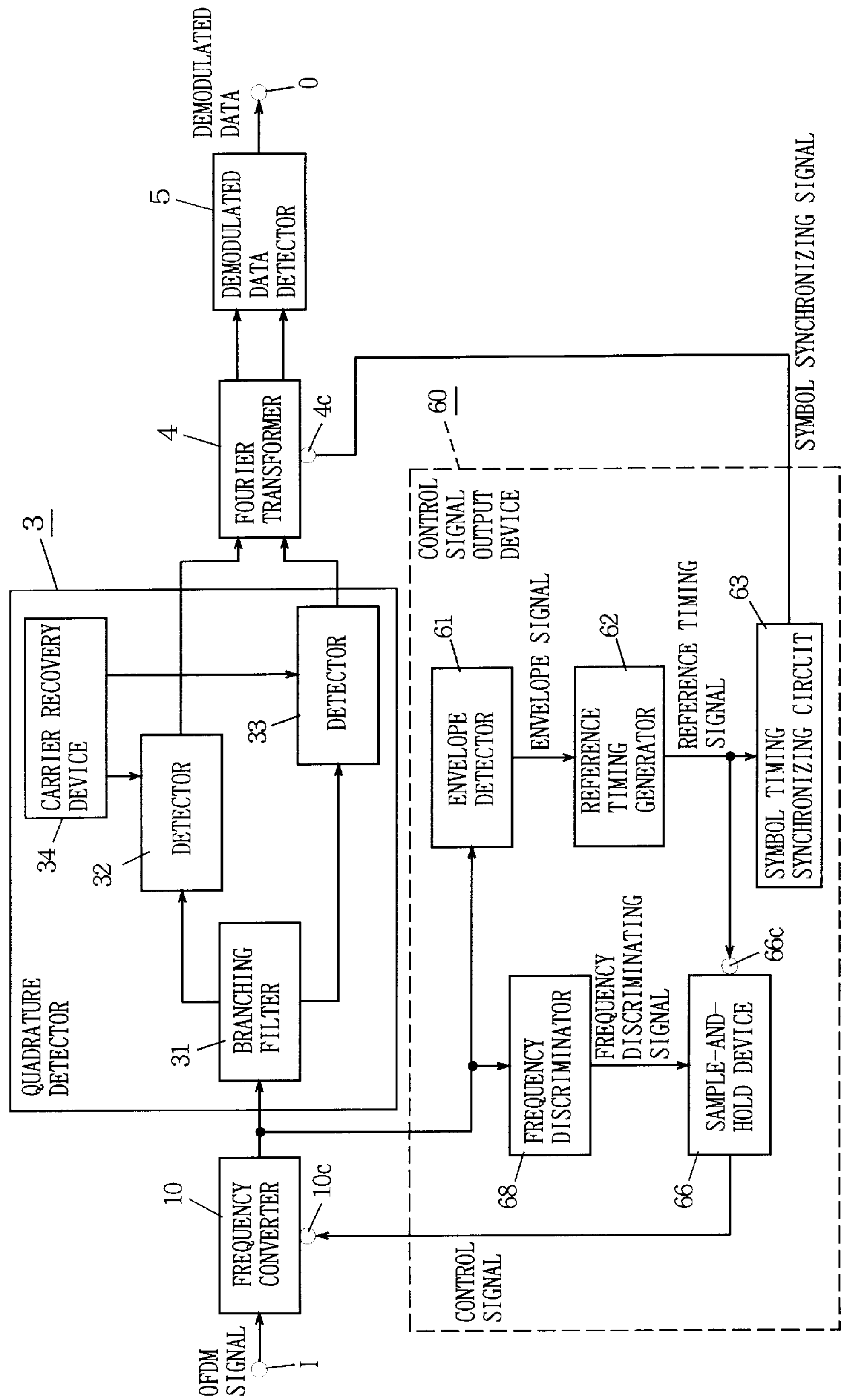

METHOD OF TRANSMITTING ORTHOGONAL FREQUENCY DIVISION MULTIPLEXING SIGNAL AND RECEIVER THEREOF

BACKGROUND OF THE INVENTION

1. Field of the Invention

The present invention relates generally to a method of transmitting an orthogonal frequency division multiplexing signal and a receiver thereof, and more particularly, to a method of transmitting an orthogonal frequency division multiplexing signal for each symbol having a predetermined length from the transmitting end to the receiving end through a predetermined transmission line, and a receiver thereof.

2. Description of the Background Art

In recent years, communication using an orthogonal frequency division multiplexing (hereinafter referred to as OFDM) signal has been given attention to in mobile digital sound broadcasting, ground digital television broadcasting or the like. The reason for this is that the OFDM signal has high frequency utilization efficiency, and allows a large amount of data to be transmitted at high speed, so that its characteristics are hardly degraded by a reflected wave even if there is no waveform equalizer. In addition, its signal waveform is in a shape close to random noise, whereby another service is not easily subjected to radio interference. A transmission system using an OFDM signal having such properties is disclosed in Japanese Patent Laid-Open Application No. 167633/1993 (hereinafter referred to as first prior art), "Next generation home service exceeds television" described on pages 101 to 124 in Nikkei Electronics (no. 574) issued in February 15, 1993 (hereinafter referred to as second prior art), and "OFDM system and its development" written by Masanori Saito in NHK Science and Technical Research Laboratories, Tokyo on pages 1 to 15 in materials of EIAJ technical seminar dated September 14, 1994 (hereinafter referred to as third prior art).

FIG. 11 is a diagram showing the structure of a conventional OFDM signal, where FIG. 11 (*a*) shows respective symbols of an OFDM signal along the time axis, and FIG. 11 (*b*) shows a portion a shown in FIG. 11 (*a*) in an enlarged manner. As shown in FIG. 11 (*a*), an OFDM signal S is constructed by arranging symbols Sm (m=1, 2, . . . ) along the time axis. Each of the symbols Sm is constructed by respectively subjecting a plurality of (tens to thousands of, for example, 512) carriers which are orthogonal in the symbol time duration ts, where each of carriers is modulated by using a digital modulation (e.g., QPSK (Quadrature Phase Shift Keying) modulation or 16 QAM (Quadrature Amplitude Modulation)), which is modulated by data to be transmitted, and OFDM symbols are generated by multiplexing the modulated carriers on the frequency axis by using an inverse FFT (fast Fourier transform) operation. Therefore, each of the symbols Sm exhibits a random amplitude distribution, as shown in FIG. 11 (*b*). The OFDM signal S takes the form of a complex signal in which a real part and an imaginary part are superposed with respect to each of the symbols Sm on a transmission line.

Such an OFDM signal is sent from the transmitting end to the receiving end through a wire or radio transmission line. In the wire transmission line, its occupied frequency band is limited by its transmission characteristics. On the other hand, in the radio transmission line, its occupied frequency band is limited by the law and regulation. Therefore, at the transmitting end, the OFDM signal is converted into an OFDM signal in the occupied frequency band of the transmission line from an OFDM signal in an intermediate frequency band. On the other hand, at the receiving end, the received OFDM signal is converted into an OFDM signal in an intermediate frequency band for a demodulating operation from an OFDM signal in the occupied frequency band of the transmission line in demodulating data.

The above-mentioned first prior art discloses a receiver comprising a band-pass filter, frequency converter and a lowpass filter for converting an OFDM signal transmitted from the transmitting end into an OFDM signal in a base band, an analog-to-digital (A/D) converter for sampling the OFDM signal in the base band and converting the sampled OFDM signal into a digital signal, an FFT demodulator for subjecting time axis data to Fourier transform to obtain data on the frequency axis for each carrier, a signal point coordinate judging circuit for judging the amplitude and the phase on a complex plane for each carrier to obtain complex data, a received data coupling circuit for converting the complex data into digital data and coupling the data depending on the number of bits transmitted by each carrier to produce a bit stream, and a deinterleave matrix and error-correcting code circuit for obtaining received data by subjecting the bit stream to deinterleave and error correction.

The above-mentioned third prior art discloses a receiver comprising a band-pass filter, a quadrature detector and a lowpass filter for converting an OFDM signal transmitted from the transmitting end to an OFDM signal in a base band, an A/D converter for sampling the OFDM signal in the base band and converting the sampled OFDM signal into a digital signal, an FFT demodulator for subjecting time axis data to Fourier transform to obtain data on the frequency axis for each carrier, and a parallel-serial converting circuit for converting parallel data on the frequency axis into serial data to obtain received data.

FIG. 12 is a block diagram showing the construction of a receiver of an OFDM signal which is easily analogized from the first prior art and the third prior art. In FIG. 12, the receiver comprises an input terminal I to which a received OFDM signal is inputted, a frequency converter 100, a quadrature detector 300, a Fourier transformer 400, and a demodulated data detector 500. The quadrature detector 300 comprises a branching filter 301, detectors 302 and 303, and a carrier recovery device 304.

The OFDM signal in an occupied frequency band (its center frequency fr) of a transmission line shown in FIG. 11 which is received by the receiver is inputted to the frequency converter 100 through the input terminal I. The frequency converter 100 shifts only a predetermined fixed frequency, to convert the OFDM signal in the occupied frequency band of the transmission line into an OFDM signal in an intermediate frequency band (its center frequency fc).

The branching filter 301 in the quadrature detector 300 divides the OFDM signal outputted from the frequency converter 100 into two signals, and outputs each of the signals obtained by dividing the OFDM signal to the detectors 302 and 303. The carrier recovery device 304 outputs an inphase carrier having a center frequency fc to the detector 302, and outputs a quadrature carrier having a center frequency fc to the detector 303. The detector 302 multiplies the OFDM signal outputted from the branching filter 301 by the inphase carrier, to output a real part of the OFDM signal. The detector 303 multiplies the OFDM signal outputted from the branching filter 301 by the quadrature carrier, to output an imaginary part of the OFDM signal. That is, the quadrature detector 300 converts the OFDM signal in the intermediate frequency band into an OFDM signal in a base band.

The Fourier transformer 400 collectively subjects the real part of the OFDM signal outputted from the detector 302 and the imaginary part of the OFDM signal outputted from the detector 303 to a Fourier transform operation, to respectively separate a real part and an imaginary part of each of digital modulated waves multiplexed on the frequency axis. The demodulated data detector 500 maps on a complex plane the real part and the imaginary part of each of the digital modulated waves, and demodulates data obtained by modulating each of the carriers from its mapped position in accordance with a threshold value set inside thereof, to output the demodulated data from an output terminal O.

Although the above-mentioned OFDM signal is transmitted from a transmitter to a receiver through a wire or radio transmission line, the OFDM signal is attenuated in either transmission line. The amount of attenuation of the OFDM signal varies depending on the change in the distance of the radio transmission line, while varying depending on, for example, the number of branches of the wire transmission line. When the amount of attenuation of the OFDM signal varies, the receiving level of the OFDM signal varies in the receiver. However, the receiver shown in FIG. 12 performs data demodulating processing, even if the receiving level of the OFDM signal varies, without any correction of the variation. In the demodulated data detector 500, therefore, the demodulated data is frequently erroneously judged.

In an FM (Frequency Modulation) receiver or the like, there is provided an automatic gain control amplifier so adapted as to correct the variation in the receiving level on the basis of the variation in an envelope of a received signal. It is considered that such a correcting method is applied to the receiver shown in FIG. 12. In the OFDM signal, however, a number of modulated carriers are multiplexed on the frequency axis, whereby the patterns of the amplitude and the phase of the OFDM signal in each of symbol sections randomly change, unlike that in an FM signal including a single carrier. Therefore, the envelope waveform of the OFDM signal frequently changes on the time axis. When the automatic gain control amplifier is controlled on the basis of such an envelope waveform, the gain of the automatic gain control amplifier becomes unstable, whereby stable control cannot be carried out. Further, in the OFDM signal, data obtained by modulating each of the carriers differs from each other, whereby the variation in the envelope waveform and the variation in the receiving level are not always correlated. Even if the level correcting method in the FM receiver is applied to the receiver of the OFDM signal, therefore, the variation in the receiving level cannot be corrected with high precision.

Furthermore, in the receiver shown in FIG. 12, the amount of frequency shift in the frequency converter 100 is fixedly set. Even if the frequency band is shifted, that is, the frequency band varies, the variation in the frequency band cannot be corrected. Therefore, the demodulated data is frequently erroneously judged.

In an AM (Amplitude Modulation) receiver or the like, there is provided a frequency converter so adapted as to correct the variation in the frequency band on the basis of the variation in frequency discrimination of a received signal. It is also considered that such a correcting method is applied to the receiver shown in FIG. 12. In the OFDM signal, however, a number of modulated carriers are multiplexed on the frequency axis, whereby the patterns of the amplitude and the phase of the OFDM signal in each of symbol sections randomly change, unlike that in an AM signal including a single carrier. Therefore, a waveform in frequency discrimination of the OFDM signal frequently changes on the frequency axis. When the frequency converter is controlled on the basis of such a waveform in frequency discrimination, the amount of frequency shift of the frequency converter becomes unstable, whereby stable control cannot be carried out. Further, in the OFDM signal, data obtained by modulating each of the carriers differs from each other, whereby the variation in the waveform in frequency discrimination and the variation in the amount of frequency shift are not always correlated. Even if the method of correcting the amount of frequency shift in the AM receiver is applied to the receiver of the OFDM signal, .therefore, the variation in the frequency band cannot be corrected with high precision.

SUMMARY OF THE INVENTION

An object of the present invention is to provide a method of transmitting an orthogonal frequency multiplexing signal and a receiver thereof in which the variation in the receiving level can be corrected with high precision, and consequently, demodulated data is not erroneously judged.

Another object of the present invention is to provide a method of transmitting an orthogonal frequency multiplexing signal and a receiver thereof in which the variation in the frequency band can be corrected with high precision, and consequently, demodulated data is not erroneously judged.

A first aspect of the present invention is directed to a method of transmitting an orthogonal frequency division multiplexing signal for each symbol having a predetermined length from the transmitting end to the receiving end through a wire or radio transmission line, being characterized in that the transmitting end continuously transmits a first symbol which includes data to be transmitted, a multiplexing signal of the data randomly changing, and intermittently transmits a second symbol having a predetermined particular pattern every time a predetermined number of first symbols are transmitted. The receiving end demodulates data on the basis of the received first symbol, and corrects the variation in the receiving level on the basis of the received second symbol.

As described in the foregoing, in the first aspect, the second symbol having a predetermined particular pattern is intermittently inserted into the first symbols including data to be transmitted and is transmitted. At the receiving end, the variation in the receiving level is detected and corrected based on the received second symbol. Because the second symbol has a particular pattern, the change in the level of the symbol is strongly correlated with the variation in the receiving level. Consequently, the variation in the receiving level can be accurately detected from the second symbol, whereby high-precision correction can be made.

A second aspect of the present invention is directed to a receiver for receiving an orthogonal frequency division multiplexing signal transmitted for each symbol having a predetermined length from the transmitting end through a wire or radio transmission line and demodulating data from the received orthogonal frequency division multiplexing signal.

A particular symbol having a predetermined particular pattern is intermittently inserted into the orthogonal frequency division multiplexing signal. The receiver includes an automatic gain control amplifying section which has a control terminal and whose gain varies depending on a control signal inputted to the control terminal, for changing the level of the received orthogonal frequency division multiplexing signal, and a control signal outputting section for detecting the particular symbol from the orthogonal frequency division multiplexing signal whose level has been changed by the automatic gain control amplifying section and generating a signal corresponding to the change in the level of the particular symbol, the signal generated by the control signal outputting section being fed back as the control signal to the automatic gain control amplifying section, to correct the variation in the receiving level of the orthogonal frequency division multiplexing signal.

As described in the foregoing, in the second aspect, the control signal outputting section detects the particular symbol from the orthogonal frequency division multiplexing signal, to generate a signal corresponding to the change in the level of the symbol. The generated signal is fed back as a control signal to the automatic gain control amplifying section. As a result, the variation in the receiving level of the orthogonal frequency division multiplexing signal is automatically corrected. Even if the receiving level of an OFDM signal varies, data demodulating processing has been conventionally performed without any correction of the variation. On the other hand, in the present invention, the variation in the receiving level is corrected, whereby the demodulated data can be prevented from being erroneously judged.

In the above-mentioned second aspect, in a preferred embodiment, the envelope signal of the particular symbol is fed as a control signal to the automatic gain control amplifying section. Even if synchronization with each of the symbols is not achieved in the receiver, therefore, the variation in the receiving level can be corrected.

In the above-mentioned second aspect, in another preferred embodiment, the symbol energy signal of the particular symbol is fed as a control signal to the automatic gain control amplifying section. Therefore, the variation in the receiving level can be detected more accurately. In this case, the energy of the particular symbol is preferably obtained by a digital operation. Consequently, the variation in the receiving level can be detected more accurately.

In the above-mentioned second aspect, in still another preferred embodiment, when the receiving is started or after the operation of the Fourier transforming section is stabilized, the envelope signal of the particular symbol or the symbol energy signal of the particular symbol is fed as a control signal to the automatic gain control amplifying section, respectively. Therefore, over the entire period from the time when the receiving is started, the variation in the receiving level can be corrected.

A third aspect of the present invention is directed to a method of transmitting an orthogonal frequency division multiplexing signal for each symbol having a predetermined length from the transmitting end to the receiving end through a wire or radio transmission line, being characterized in that the transmitting end continuously transmits a first symbol which includes data to be transmitted, a multiplexing signal of the data randomly changing, and intermittently transits a second signal having a predetermined particular pattern every time a predetermined number of first symbols are transmitted. The receiving end demodulates data on the basis of the received first symbol, and corrects the variation in the frequency band on the basis of the received second symbol.

As described in the foregoing, in the third aspect, the second symbol having a predetermined particular pattern is intermittently inserted into the first symbol including data to be transmitted and is transmitted. At the receiving end, the variation in the frequency band is detected and corrected based on the received second symbol. Since the second symbol has a particular pattern, the change in the frequency of the symbol is strongly correlated with the variation in the change in the frequency band. Consequently, the variation in the frequency band can be accurately detected from the second symbol, whereby high-precision correction can be made.

A fourth aspect of the present invention is directed to a receiver for receiving an orthogonal frequency division multiplexing signal transmitted for each symbol having a predetermined length from the transmitting end through a wire or radio transmission line and demodulating data from the received orthogonal frequency division multiplexing signal.

A particular symbol having a predetermined particular pattern is intermittently inserted into the orthogonal frequency division multiplexing signal. The receiver including a frequency converting section which has a control terminal and whose amount of frequency shift varies depending on a control signal inputted to the control terminal to change the frequency band of the orthogonal frequency division multiplexing signal, and a control-signal-outputting section for detecting the particular symbol from the orthogonal frequency division multiplexing signal whose frequency band has been changed by the frequency converting section and generating a signal corresponding to the change in the frequency band of the particular symbol, the signal generated by the control-signal-outputting section being fed back as the control signal, to correct the variation in the frequency band of the orthogonal frequency division multiplexing signal.

As described in the foregoing, in the fourth aspect, the control signal outputting section detects the particular symbol from the orthogonal frequency division multiplexing signal, to generate a signal corresponding to the change in the frequency band. The generated signal is fed back as a control signal to the frequency converting section. As a result, the variation in the frequency band of the orthogonal frequency division multiplexing signal is automatically corrected. Even if the frequency band of an OFDM signal varies, data demodulating processing has been conventionally performed without any correction of the variation. On the other hand, in the present invention, the variation in the frequency band is corrected, whereby the demodulated data can be prevented from being erroneously judged.

In the above-mentioned fourth aspect, in a preferred embodiment, a frequency discriminating signal, a frequency region energy signal or a peak value frequency signal of the particular symbol is fed as a control signal to the frequency converting section. Therefore, the variation in the frequency band can be accurately detected, whereby high-precision correction can be made.

In each of the above-mentioned aspects of the present invention, various structures are considered as the structure of the particular symbol. For example, a signal in which only one carrier is left as a non-modulated single tone signal and the other carriers are suppressed may be included. Further, a signal in which only one carrier is modulated by predetermined data and the other carriers are suppressed may be included. In this case, as data used for the modulation, a pseudo random code is preferably used. When the pseudo random code is used, the correlation at the receiving end is easily achieved. In addition, the data rate of the pseudo random code is preferably selected as integer multiples of the symbol rate of the orthogonal frequency division multiplexing signal. Consequently, synchronization at the receiving end is easily achieved.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram showing the construction of a receiver according to a first embodiment of the present invention;

FIG. 5 is a block diagram showing the construction of a receiver according to a second embodiment of the present invention;

DESCRIPTION OF THE PREFERRED EMBODIMENTS

Figure 1:
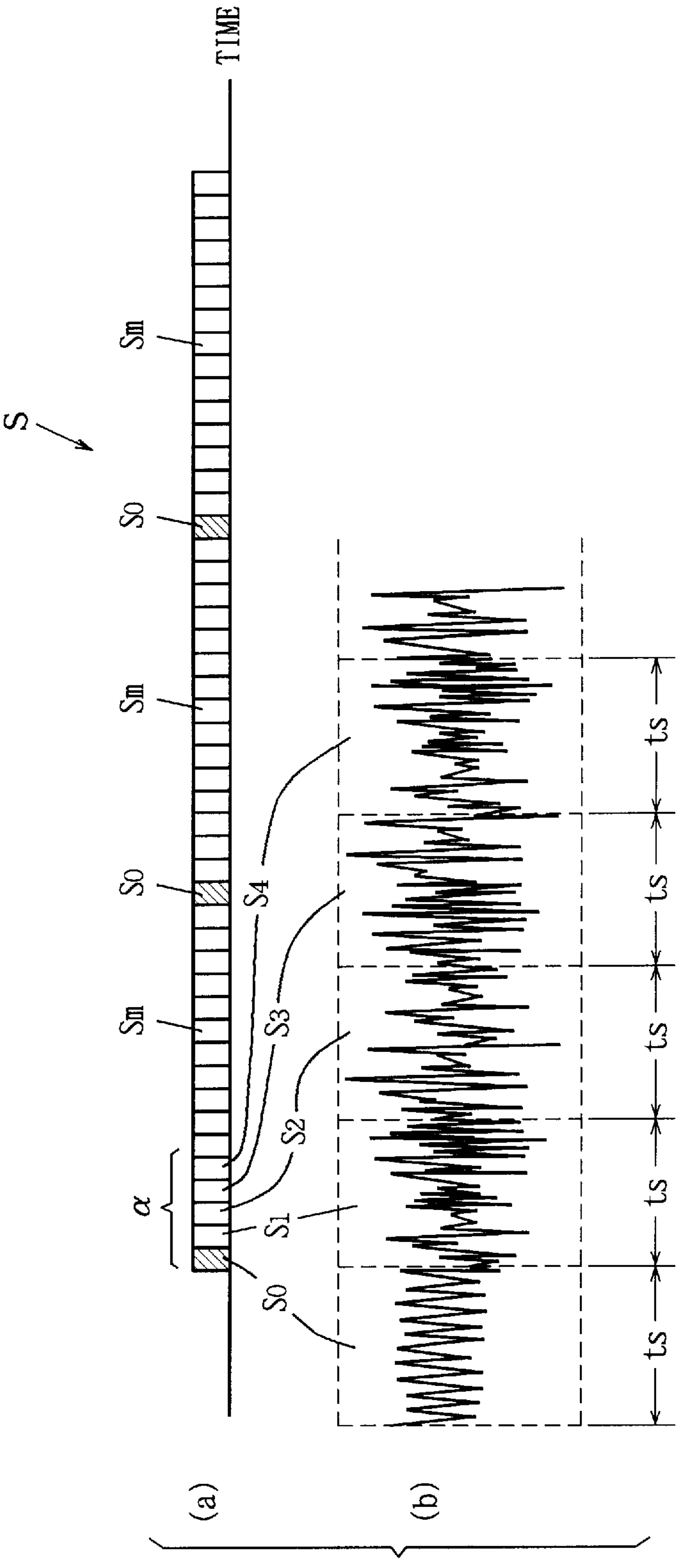
FIG. 1 is a diagram showing one example of the structure of an OFDM signal transmitted from the transmitting end in the present invention.

Description is now made of embodiments of the present invention on the basis of drawings. FIG. 1 is a diagram showing one example of the structure of an OFDM signal transmitted from the transmitting end to the receiving end in the present invention. Particularly, FIG. 1 (*a*) shows respective symbols of the OFDM signal along the time axis, and FIG. 1 (*b*) shows a portion α shown in FIG. 1 (*a*) in an enlarged manner.

As shown in FIG. 1 (*a*), an OFDM signal S is constructed by arranging a particular symbol S0 for automatic gain control indicated by hatching and symbols Sm (m=1, 2, . . . ) for demodulation indicated without hatching along the time axis. The symbol S0 is inserted for each predetermined symbol interval (e.g., for each interval of 15 symbols). The OFDM signal S takes the form of an analog complex signal in which a real part and an imaginary part are superposed with respect to each of the symbols S0 and Sm on a transmission line.

Each of the symbols Sm is constructed by multiplexing (performing an inverse fast Fourier operation of) a plurality of (tens to thousands of, for example, 512) carriers which differ in frequency (which are orthogonal in symbol time ts) on the frequency axis. Each of the carriers is subjected to digital modulation (e.g., QPSK modulation or 16QAM) by data to be demodulated at the receiving end. Therefore, each of the symbols Sm exhibits a random amplitude distribution, as shown in FIG. 1 (*b*).

Each of the symbols S0 is constructed by performing an inverse fast Fourier operation of, for example, a signal in which one of the plurality of carriers (its frequency fc, for example) is left as a non-modulated single tone signal and the other carriers are suppressed. Therefore, each of the symbols S0 exhibits an amplitude distribution of a particular pattern, as shown in FIG. 1 (*b*). In such a symbol S0, a time axis component as well as a frequency axis component are known. The OFDM signal S is transmitted from the transmitting end to the receiving end through a wire or radio transmission line (not shown). Therefore, the OFDM signal S is attenuated on the transmission line. In order to compensate for the attenuation on the transmission line in demodulating data at the receiving end, therefore, the level of the received OFDM signal S must be corrected. Such an operation of correcting the receiving level of the OFDM signal S is performed using the symbol S0. The reason for this is that the symbol S0 always includes a signal of the same pattern, whereby the change in the receiving level can be accurately measured from the waveform of the symbol S0.

FIG. 2 is a block diagram showing the construction of a receiver according to a first embodiment of the present invention. In FIG. 2, the receiver comprises an input terminal I to which a received OFDM signal is inputted, a band-pass filter 1, an automatic gain control amplifier 2, a quadrature detector 3, A/D converters 7 and 8, a Fourier transformer 4, a demodulated data detector 5, a control signal output device 6, and an output terminal 0. The quadrature detector 3 comprises a branching filter 31, detectors 32 and 33, and a carrier recovery device 34. The control signal output device 6 comprises an envelope detector 61, a reference timing generator 62, a symbol timing synchronizing circuit 63, a symbol energy detector 64, a control signal switching device 65, a sample-and-hold device 66, and a lowpass filter 67.

Figure 3:
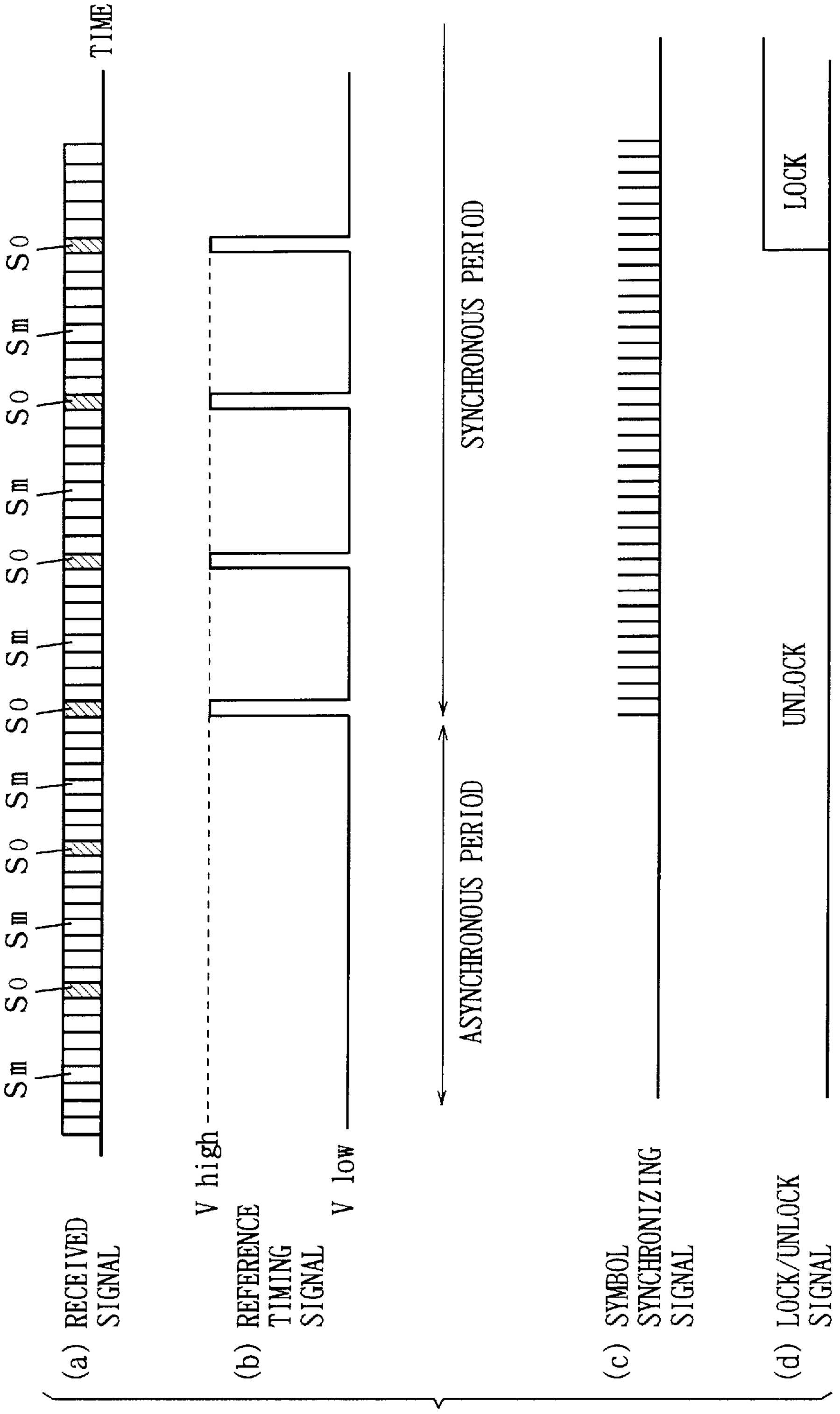
FIG. 3 is a waveform diagram showing signals in each of sections of the receiver shown in FIG. 2.

FIG. 3 is a waveform diagram showing signals in the respective sections of the receiver shown in FIG. 2. Referring now to FIG. 3, the operations of the receiver shown in FIG. 2 will be described.

The OFDM signal (see FIG. 1) received by the receiver is converted from an OFDM signal in an occupied frequency band of the transmission line to an OFDM signal in an intermediate frequency band (its center frequency fc) by a frequency converter (not shown), after which the OFDM signal in the intermediate frequency band is inputted to the band-pass filter 1 through the input terminal 1. The band-pass filter 1 removes a signal component in an unnecessary band from the OFDM signal in the intermediate frequency band, and takes out only an OFDM signal in a necessary band. The OFDM signal outputted from the band-pass filter 1 is fed to the quadrature detector 3 through the automatic gain control amplifier 2.

The branching filter 31 in the quadrature detector 3 divides the OFDM signal outputted from the automatic gain control amplifier 2 into two signals, and outputs the each of the signals obtained by dividing the OFDM signal to the detectors 32 and 33. The carrier recovery device 34 outputs an inphase carrier having a center frequency fc to the detector 32, and outputs a quadrature carrier having a center frequency fc to the detector 33. The detector 32 multiplies the OFDM signal outputted from the branching filter 31 by the inphase carrier, to output a real part of the OFDM signal. The detector 33 multiplies the OFDM signal outputted from the branching filter 31 by the quadrature carrier, to output an imaginary part of the OFDM signal. That is, the quadrature detector 3 converts the OFDM signal in the intermediate frequency band into an OFDM signal in a base band. The A/D converter 7 converts the real part of the OFDM signal outputted from the detector 32 from an analog signal to a digital signal. The A/D converter 8 converts the imaginary part of the OFDM signal outputted from the detector 33 from an analog signal to a digital signal.

The Fourier transformer 4 collectively subjects the real part of the digital OFDM signal outputted from the A/D converter 7 and the imaginary part of the digital OFDM signal outputted from the A/D converter 8 to a Fourier transform operation, thereby to separate a real part and an imaginary part of each of digital modulated waves on the frequency axis. The Fourier transformer 4 has a clock terminal 4*c*, and starts the adjustment of the time axis of a time window used for Fourier transform on the basis of a symbol synchronizing signal outputted from the symbol timing synchronizing circuit 63 and starts Fourier transform of each of the symbols. The demodulated data detector 5 maps the real part and the imaginary part of each of the digital modulated waves on a complex plane, and demodulates data obtained by modulating each of the carriers from its mapped position in accordance with a threshold value set inside thereof.

The operation mode of the control signal output device 6 includes a first mode in which a control signal of the automatic gain control amplifier 2 is generated on the basis of an envelope waveform of an output signal of the quadrature detector 3 and a second mode in which a control signal of the automatic gain control amplifier 2 is generated on the basis of the symbol energy of an output signal of the Fourier transformer 4. The control signal output device 6 is operated in the first mode when the receiving of the OFDM signal is started, while being operated in the second mode after the operation of the Fourier transformer 4 is stabilized (i.e., after it is synchronized with a received signal). The operation of the control signal output device 6 will be described in more detail.

The envelope detector 61 envelope detects each of the symbols of the OFDM signals which are outputted from the detectors 32 and 33, to output an envelope signal representing an envelope of the symbol. The envelope signal outputted from the envelope detector 61 is fed to the reference timing generator 62, and is fed to a control signal input terminal 65*a* of the control signal switching device 65 through the lowpass filter 67 for smoothing the variation.

The reference timing generator 62 previously stores single tone data corresponding to a particular pattern of the symbol S0 inside thereof. The reference timing generator 62 finds the correlation between the envelope signal outputted from the envelope detector 61 and the stored single tone data along the time axis for each symbol, to output a reference timing signal indicating whether or not the symbol S0 is detected. Specifically, the reference timing generator 62 outputs a reference timing signal at a high level (at a voltage Vhigh) when the symbol S0 is detected, while outputting a reference timing signal at a low level (at a voltage Vlow) when the symbol Sm including no particular pattern is detected, as shown in FIGS. 3 (*a*) and 3 (*b*). The reference timing generator 62 outputs the reference timing signal at a low level (at a voltage Vlow) even when the symbol S0 is received until its detecting operation is stabilized (synchronized) with respect to a received signal (i.e., during an asynchronous period). The reference timing signal outputted from the reference timing generator 62 is inputted to the symbol timing synchronizing circuit 63 and a clock terminal 66*c* of the sample-and-hold device 66, respectively.

The symbol timing synchronizing circuit 63 outputs a symbol synchronizing signal (see FIG. 3 (*c*)) which is synchronized with each of the symbols on the basis of the reference timing signal fed from the reference timing generator 62. Specifically, the symbol timing synchronizing circuit 63 comprises a clock circuit inside thereof, and outputs a clock pulse (a clock pulse using symbol time ts as one period) which is synchronized with the head end of each of the symbols, that is, a symbol synchronizing signal from the clock circuit every time the leading edge of the reference timing signal is detected. The symbol synchronizing signal is inputted to the clock terminal 4*c* of the Fourier transformer 4 and a clock terminal 64*c* of the symbol energy detector 64, respectively.

Furthermore, the symbol timing synchronizing circuit 63 outputs a lock/unlock signal (see FIG. 3 (*d*)) on the basis of the reference timing signal fed from the reference timing generator 62. The lock/unlock signal assumes its unlocked state at a low level, while assuming its locked state at a high level. At the beginning of the start of the receiving, the lock/unlock signal is in the unlocked state. The symbol timing synchronizing circuit 63 comprises a counter for counting the clock pulse inside thereof, and resets the counter every time it detects the leading edge of the reference timing signal. The symbol timing synchronizing circuit 63 judges that the adjustment of the time window in the Fourier transformer 4 is completed and a state where the internal counter is reset at the time point where it reaches a predetermined counted value (a symbol interval at which the symbol S0 is inserted, 15 in this case) is repeated a predetermined number of times (i.e., if the symbol S0 is stably inputted a predetermined number of times), to switch the lock/unlock signal from the unlocked state to the locked state. The lock/unlock signal is inputted to a clock terminal 65*c* of the control signal switching device 65.

The symbol energy detector 64 comprises a digital-to-analog (D/A) converter (not shown) inside thereof. The symbol energy detector 64 squares and integrates (integrates the square of) a signal component of each of the carriers on the frequency axis in each of the symbols outputted from the Fourier transformer 4 in the symbol period ts by a digital operation in synchronization with the symbol synchronizing signal fed from the symbol timing synchronizing circuit 63, to find the energy of the symbol once in terms of a digital value. The found digital energy value is converted into an analog value by the D/A converter, to output an analog symbol energy signal representing the energy of the symbol. This energy is directly proportional to the average level of each of the symbols. The signal component of each of the carriers is squared so as to find, because the amplitude of the carrier varies on the positive and negative sides along the time axis, the absolute value thereof. In addition, the signal component of each of the carriers is integrated so as to find the average value thereof. The symbol energy signal outputted from the symbol energy detector 64 is inputted to a control signal input terminal 65*b* of the control signal switching device 65.

The control signal switching device 65 selects the envelope signal outputted from the envelope detector 61 when the lock/unlock signal inputted to the clock terminal 65*c* is in the locked state, while selecting the symbol energy signal outputted from the symbol energy detector 64 when it is in the unlocked state, and outputs the selected signal as a control signal of the automatic gain control amplifier 2.

The sample-and-hold device 66 samples and holds the control signal selected by the control signal switching device 65 when the reference timing signal at a voltage Vhigh is inputted from the reference timing generator 62 to the clock terminal 66*c*, that is, when the particular symbol S0 is outputted from the automatic gain control amplifier 2. The control signal held by the sample-and-hold device 66 is fed to a control terminal 2*c* of the automatic gain control amplifier 2. The gain A of the automatic gain control amplifier 2 varies depending on the voltage level of the control signal fed from the sample-and-hold device 66.

When the receiving level of the OFDM signal is increased, the level of the envelope signal or the symbol energy signal of the symbol S0 is also increased in proportion to the increased receiving level, whereby the voltage level of the control signal fed to the automatic gain control amplifier 2 is increased. At this time, the automatic gain control amplifier 2 decreases the gain A so as to decrease the level of the received OFDM signal. On the other hand, when the receiving level of the OFDM signal is decreased, the level of the envelope signal or the symbol energy signal of the symbol S0 is also decreased in proportion to the decreased receiving level, whereby the voltage level of the control signal fed to the automatic gain control amplifier 2 is decreased. At this time, the automatic gain control amplifier 2 increases the gain A so as to increase the level of the received OFDM signal. As a result, the automatic gain control amplifier 2 can correct the variation in the receiving level of the OFDM signal to a suitable level.

The symbol energy signal is the energy of each of the symbols S0, and is found by a digital operation, whereby the symbol energy signal includes few errors. On the other hand, the envelope signal is an envelope connecting vertexes of the waveform of each of the symbols S0, whereby the envelope signal includes the difference between the waveform and the envelope of the symbol S0 as an error. Moreover, the envelope signal requires filtering processing (performed by the lowpass filter 67) because it is used as a control signal of the automatic gain control amplifier 2, whereby an error also occurs in the filtering processing. Therefore, the control precision of the gain of the automatic gain control amplifier 2 in a case where the symbol energy signal is used can be improved more than that in a case where the envelope signal is used.

The Fourier transformer 4 starts the adjustment of the time axis of the time window used for Fourier transform when the symbol synchronizing signal is outputted from the symbol timing synchronizing circuit 63. However, it takes time to adjust the time axis of the time window. When the receiving of the OFDM signal is started, therefore, a state where the time window and the received symbol are not synchronized (i.e., a state where the time window is set across a plurality of symbols adjacent to each other) may occur. In such a state, the normal operations of the Fourier transformer 4 and the symbol energy detector 64 are not ensured.

Therefore, the control signal output device 6 controls the gain of the automatic gain control amplifier 2 in the first operation mode, that is, on the basis of the envelope signal of the symbol S0 for some time after starting the receiving of the OFDM signal (until the adjustment of the time axis of the time window of the Fourier transformer 4 is completely terminated). Thereafter, the control signal output device 6 controls the gain of the automatic gain control amplifier 2 in the second operation mode, that is, on the basis of the symbol energy signal of the symbol S0.

As described in the foregoing, according to the embodiment shown in FIG. 2, the particular symbol S0 is periodically detected by the reference timing generator 62, and the envelope signal or the symbol energy signal of the symbol S0 is sampled and held by the sample-and-hold device 66 and is fed back to the control terminal 2*c* of the automatic gain control amplifier 2, whereby the precision of the gain control of the automatic gain control amplifier 2 can be improved. In addition, the attenuation on the transmission line is compensated for by the gain control, that is, the receiving level is corrected, whereby demodulated data can be prevented from being erroneously judged.

Although in the above-mentioned embodiment, the symbol S0 is inserted at intervals of 15 symbols, the symbol S0 may be inserted at the other intervals of symbols. Further, although in the above-mentioned embodiment, the symbol S0 is constructed by using only one carrier as a non-modulated single tone signal and suppressing the other carriers, the symbol S0 may be constructed by another method, provided that it is a signal whose time axis component and frequency axis component are known and whose amplitude and phase along the time axis are changed in predetermined particular patterns. For example, the amplitude of one carrier may be modulated by a plurality of known data (e.g., data of "1" and data of "2"). In this case, slight irregularities occur in the envelope of the envelope signal outputted from the envelope detector 61. Since the irregularities are smoothed by the lowpass filter 67, however, the envelope signal can be used as a control signal.

Furthermore, although in the above-mentioned embodiment, the OFDM signal in the base band outputted from the quadrature detector 3 is inputted to the envelope detector 61, an output of any one of the automatic gain control amplifier 2 and the subsequent sections, that is, the automatic gain control amplifier 2, the A/D converters 7 and 8, and the Fourier transformer 4 may be inputted to the envelope detector 61.

Although in the above-mentioned embodiment, the output of the Fourier transformer 4 is inputted to the symbol energy detector 64, an output of any one of the automatic gain control amplifier 2 and the subsequent sections, that is, the automatic gain control amplifier 2, the quadrature detector 3, and the A/D converters 7 and 8 may be inputted to the symbol energy detector 64.

Although in the above-mentioned embodiment, the A/D converters 7 and 8 are provided, they may be deleted to perform Fourier transform and symbol energy detection with the OFDM signal being analog.

Furthermore, although in the above-mentioned embodiment, the control signal output device 6 is so constructed as to be operated in two operation modes, it may be so constructed as to be operated only in the first operation mode. In this case, the control signal output device comprises only the envelope detector 61, the reference timing generator 62, and the sample-and-hold device 66.

Additionally, the control signal output device 6 may be so constructed as to be operated only in the second operation mode. In this case, the control signal output device comprises only the envelope detector-61, the reference timing generator 62, the symbol timing synchronizing circuit 63, the symbol energy detector 64 and the sample-and-hold device 66.

Figure 4:
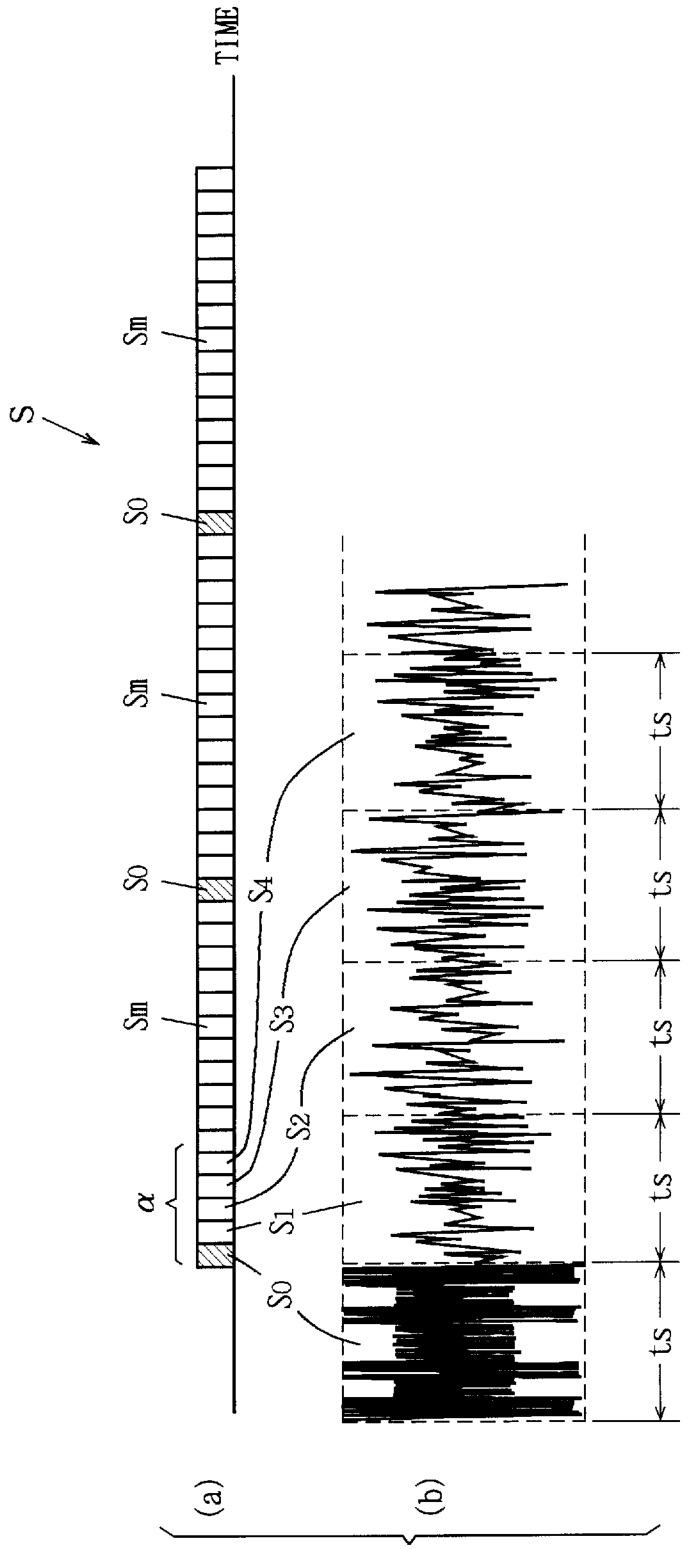
FIG. 4 is a diagram showing another example of the structure of an OFDM signal transmitted from the transmitting end.

FIG. 4 is a diagram showing another example of the structure of the OFDM signal transmitted from the transmitting end to the receiving end in the present invention. Particularly, FIG. 4 (*a*) shows respective symbols of the OFDM signal along the time axis, and FIG. 4 (*b*) shows a portion a shown in FIG. 4 (*a*) in an enlarged manner.

As shown in FIG. 4 (*a*), an OFDM signal S is constructed by arranging a particular symbol S0 for controlling frequency conversion indicated by hatching and symbols Sm (m=1, 2, . . . ) for demodulation indicated without hatching along the time axis. The symbol S0 is inserted for each predetermined symbol interval (e.g., at intervals of 15 symbols). The OFDM signal S takes the form of a complex signal in which a real part and an imaginary part are superposed with respect to each of the symbols S0 and Sm on the transmission line.

Each of the symbols Sm is constructed by multiplexing (executing an inverse fast Fourier operation of) a plurality of (tens to thousands of, for example, 512) carriers which differ in frequency (which are orthogonal in symbol time ts) on the frequency axis. Each of the carriers is subjected to digital modulation (e.g., QPSK modulation or 16 QAM) by data to be demodulated at the receiving end. Therefore, each of the symbols Sm exhibits a random amplitude distribution, as shown in FIG. 4 (*b*).

Each of the symbols S0 is constructed by executing an inverse fast Fourier operation of a signal in which one of the plurality of carriers (its frequency fc, for example) is left as a pseudo random signal by amplitude modulation using a binary (e.g., "1" and "2") pseudo random code and the other carriers are suppressed. Therefore, each of the symbols S0 exhibits an amplitude distribution of a particular pattern, as shown in FIG. 4 (*b*). In such a symbol S0, a time axis component as well as a frequency axis component are known.

The data speed of the pseudo random code is preferably selected as integer multiples of the OFDM symbol rate. Consequently, an integer number of pseudo random code information are contained in one symbol S0, whereby synchronization at the receiving end is easily achieved. Further, the repetition period of the pattern of the pseudo random code used is preferably identical to the symbol period. In this case, the number of times of appearance of one code (e.g., "1") and the number of times of appearance of the other code (e.g., "2") are equal to each other, whereby the correlation at the receiving end is easily achieved.

The OFDM signal S shown in FIG. 4 is sent from the transmitting end to the receiving end through a wire or radio transmission line (not shown). Therefore, at the transmitting end (not shown), the OFDM signal S is converted into an OFDM signal in an occupied frequency band (its center frequency fr) of the transmission line from an OFDM signal in an intermediate frequency band (its center frequency fc). On the other hand, at the receiving end, the received OFDM signal S is converted from an OFDM signal in the occupied frequency band of the transmission line to an OFDM signal in an intermediate frequency band for demodulating work (its center frequency fc) in demodulating data. In an embodiment as described below, an operation of frequency-converting the OFDM signal S from the occupied frequency band to the intermediate frequency band is performed using the symbol S0. The reason for this is that the symbol S0 always includes a signal of the same pattern, whereby the change in the frequency band can be accurately measured from the waveform of the symbol S0.

FIG. 5 is a block diagram showing the construction of a receiver according to a second embodiment of the present invention. In FIG. 5, the receiver comprises an input terminal I to which a received OFDM signal is inputted, a frequency converter 10, a quadrature detector 3, a Fourier transformer 4, a demodulated data detector 5, a control signal output device 60, and an output terminal O. The quadrature detector 3 comprises a branching filter 31, detectors 32 and 33, and a carrier recovery device 34. The control signal output device 60 comprises an envelope detector 61, a reference timing generator 62, a symbol timing synchronizing circuit 63, a sample-and-hold device 66, and a frequency discriminator 68. In order to clarify the correspondence, the same sections as those in the embodiment shown in FIG. 2 are assigned the same reference numerals in the embodiment shown in FIG. 5.

Figure 6:
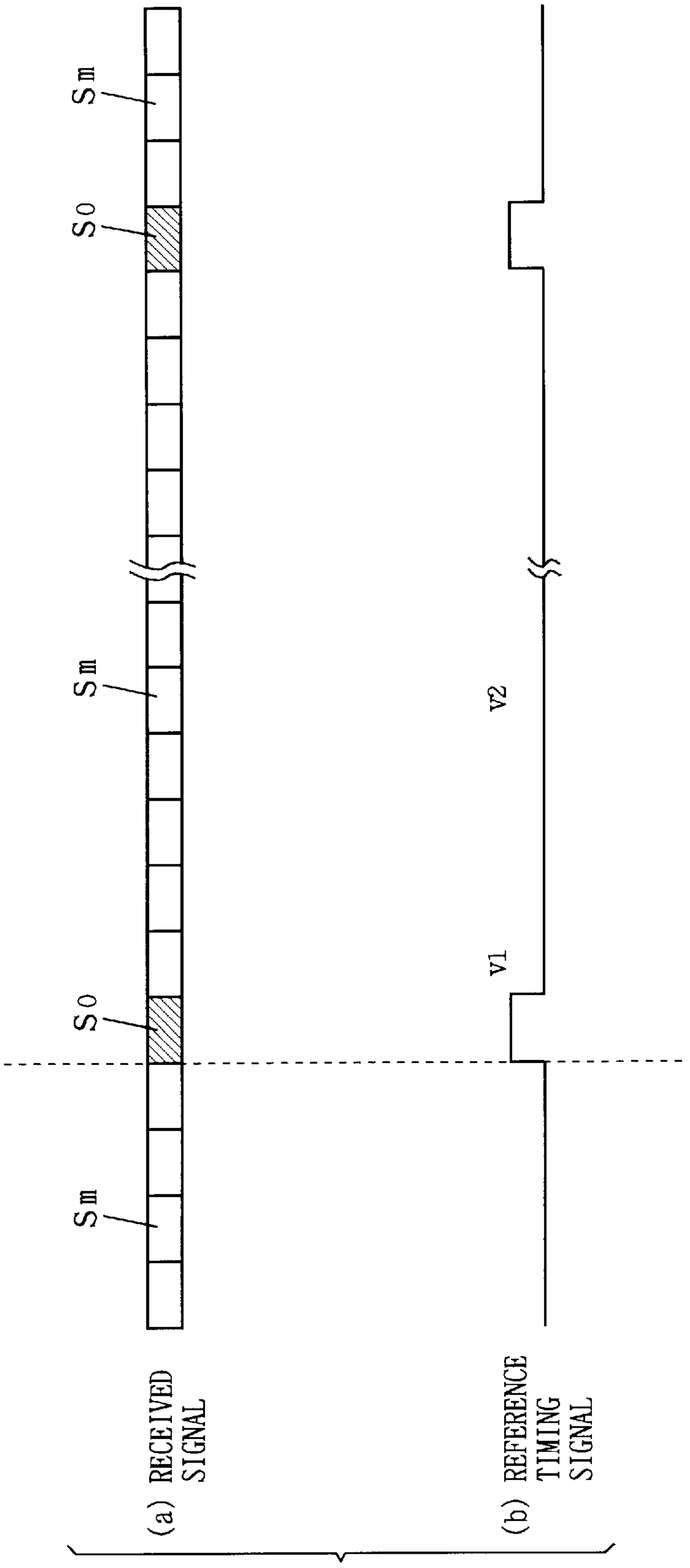
FIG. 6 is a waveform diagram showing signals in each of sections of the receiver shown in FIG. 5.

FIG. 6 is a waveform diagram showing signals in the respective sections of the receiver shown in FIG. 5. Referring now to FIG. 6, the operations of the receiver shown in FIG. 5 will be described.

An OFDM signal (see FIG. 6 (a)) in an occupied frequency band (its center frequency fr) of a transmission line received by the receiver is inputted to the input terminal I, and is converted into an OFDM signal in an intermediate frequency band (its center frequency fc) by the frequency converter 10, after which the OFDM signal in the intermediate frequency band is inputted to the quadrature detector 3.

The branching filter 31 in the quadrature detector 3 divides the OFDM signal outputted from the frequency converter 10 into two signals, and outputs each of the signals obtained by dividing the OFDM signal to the detectors 32 and 33. The carrier recovery device 34 outputs an inphase carrier having a center frequency fc to the detector 32, and outputs a quadrature carrier having a center frequency fc to the detector 33. The detector 32 multiplies the OFDM signal outputted from the branching filter 31 by the inphase carrier, to output a real part of the OFDM signal. The detector 33 multiplies the OFDM signal outputted from the branching filter 31 by the quadrature carrier, to output an imaginary part of the OFDM signal. That is, the quadrature detector 3 converts the OFDM signal in the intermediate frequency band into an OFDM signal in a base band.

The Fourier transformer 4 collectively subjects the real part of the OFDM signal outputted from the detector 32 and the imaginary part of the OFDM signal outputted from the detector 33 to a Fourier transform operation, thereby to separate a real part and an imaginary part of each of digital modulated waves on the frequency axis. The demodulated data detector 5 maps the real part and the imaginary part of each of the digital modulated waves on a complex plane, and demodulates data obtained by modulating each of the carriers from its mapped position in accordance with a threshold value set inside thereof.

The operation of the control signal output device 60 will be described in more detail. The envelope detector 61 envelope-detects each of the symbols of the OFDM signal outputted from the frequency converter 10, to output an envelope signal representing an envelope of the symbol. The envelope signal outputted from the envelope detector 61 is fed to the reference timing generator 62.

The reference timing generator 62 previously stores binary pseudo random data corresponding to a particular pattern of a symbol S0 inside thereof. The reference timing generator 62 finds for each symbol the correlation between the envelope signal outputted from the envelope detector 61 and the stored binary pseudo random data along the time axis, to output a reference timing signal indicating whether or not the symbol S0 is defected. Specifically, the reference timing generator 62 outputs a reference timing signal at a high level (at a voltage V1) when the symbol S0 including a particular pattern is detected, while outputting a reference timing signal at a low level (at a voltage V2) when a symbol Sm including no particular pattern is detected, as shown in FIGS. 6 (*a*) and 6 (*b*). The reference timing signal outputted from the reference timing generator 62 is inputted to a clock terminal 66*c* of the sample-and-hold device 66 and the symbol timing synchronizing circuit 63.

The symbol timing synchronizing circuit 63 outputs a symbol synchronizing signal which is synchronized with each of the symbols on the basis of the reference timing signal fed from the reference timing generator 62. Specifically, the symbol timing synchronizing circuit 63 comprises a clock circuit inside thereof, and outputs a clock pulse (a clock pulse using symbol time ts as one period) which is synchronized with the head end of each of the symbols, that is, a symbol synchronizing signal from the clock circuit every time the leading edge of the reference timing signal is detected. The symbol synchronizing signal is inputted to a clock terminal 4*c* of the Fourier transformer 4.

The Fourier transformer 4 collectively subjects the real part of the digital OFDM signal outputted from the detector 32 and the imaginary part of the digital OFDM signal outputted from the detector 33 to a Fourier transform operation, thereby to separate the real part and the imaginary part of each of the digital modulated waves on the frequency axis. The Fourier transformer 4 has the clock terminal 4*c*, and starts the adjustment of the time axis of a time window used for Fourier transform on the basis of the symbol synchronizing signal outputted from the symbol timing synchronizing circuit 63 and starts the Fourier transform of each of the symbols. The demodulated data detector 5 maps the real part and the imaginary part of each of the digital modulated waves on a complex plane, and demodulates data obtained by modulating each of the carriers from its mapped position in accordance with a threshold value set inside thereof.

The frequency discriminator 68 frequency-discriminates each of the symbols, to generate a voltage corresponding to the frequency of the symbol. The sample-and-hold device 66 samples and holds a frequency discriminating signal outputted from the frequency discriminator 68 when the reference timing signal at a voltage V1 is inputted from the reference timing generator 62 to the clock terminal 66*c,* that is, when the particular symbol S0 is outputted from the frequency converter 10. The frequency discriminating signal held in the sample-and-hold device 66 is fed as a control signal to a control terminal 10*c* of the frequency converter 10. The amount of frequency shift of the frequency converter 10 varies depending on the voltage level of the control signal fed from the sample-and-hold device 66.

When the frequency band of the OFDM signal outputted from the frequency converter 10 is increased, the level of the frequency discriminating signal of the symbol S0 outputted from the frequency discriminator 68 is also increased in proportion to the increased frequency band, whereby the voltage level of the control signal fed to the frequency converter 10 is increased. At this time, the frequency converter 10 increases the amount of frequency shift so as to decrease the frequency band of the outputted OFDM signal. On the other hand, when the frequency of the OFDM signal is decreased, the level of the frequency discriminating signal of the symbol S0 is also decreased in proportion to the decreased frequency, whereby the voltage level of the control signal fed to the frequency converter 10 is decreased. At this time, the frequency converter 10 decreases the amount of frequency shift so as to increase the frequency band of the outputted OFDM signal. As a result, the frequency converter 10 can correct the variation in the frequency band of the OFDM signal to a suitable intermediate frequency band (its center frequency fc).

As described in the foregoing, according to the second embodiment shown in FIG. 5, the particular symbol S0 is periodically detected by the reference timing generator 62, and the frequency discriminating signal of the symbol S0 is sampled and held as a control signal, and the control signal is fed back to the control terminal 10*c* of the frequency converter 10, whereby the precision of control of the amount of frequency shift of the frequency converter 10 can be improved. In addition, the variation in the frequency band is corrected by the control of the amount of frequency shift. Accordingly, there is no shift from the intermediate frequency band, whereby demodulated data can be prevented from being erroneously judged.

Figure 7:
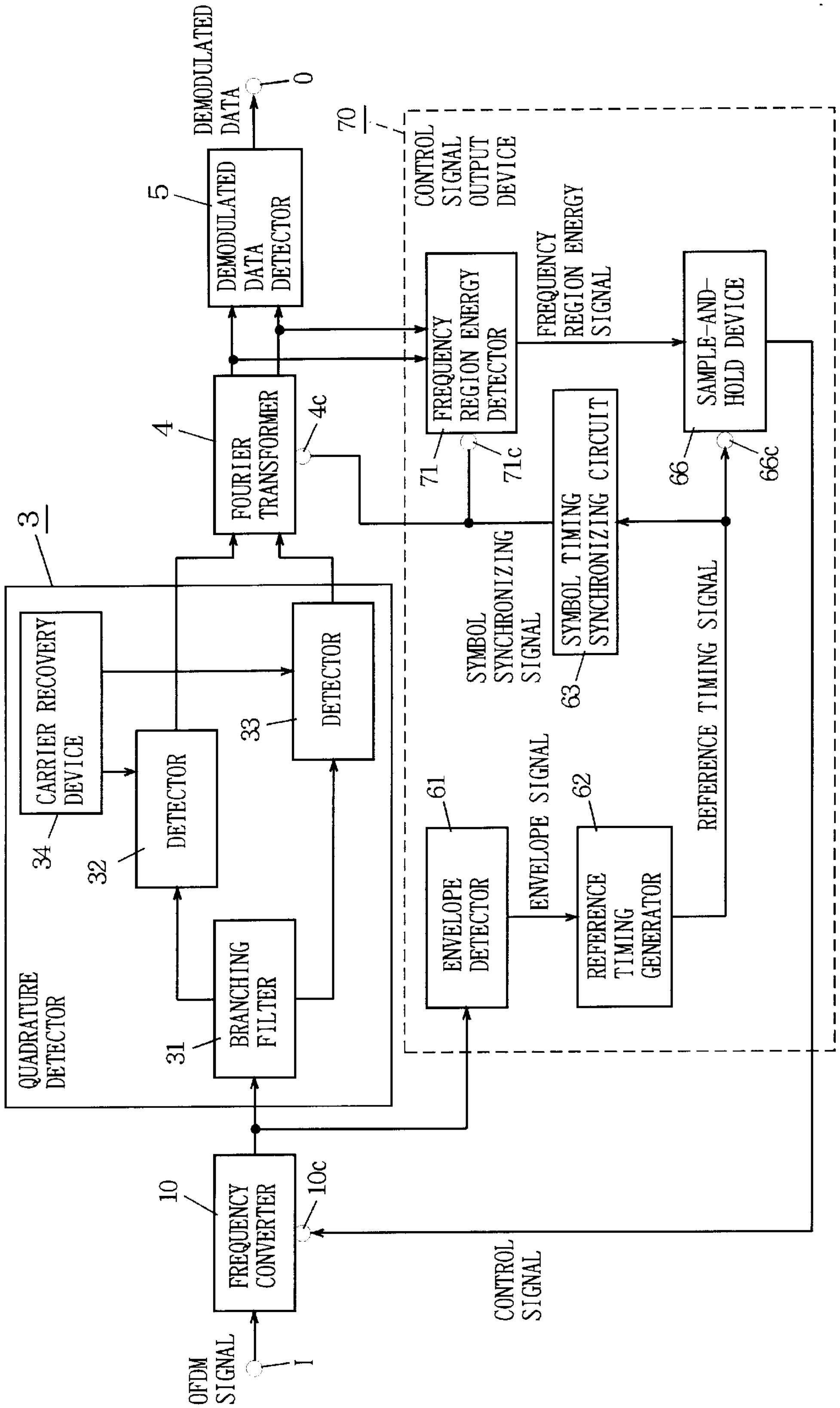
FIG. 7 is a block diagram showing the construction of a receiver according to a third embodiment of the present invention.

FIG. 7 is a block diagram showing the construction of a receiver according to a third embodiment of the present invention. Sections corresponding to the sections in the receiver shown in FIG. 5 are assigned the same reference numerals and hence, the description thereof is not repeated. It should be noted in the third embodiment that a frequency region energy detector 71 is used in place of the frequency discriminator 68 shown in FIG. 5, to construct a control signal output device 70.

Figure 8:
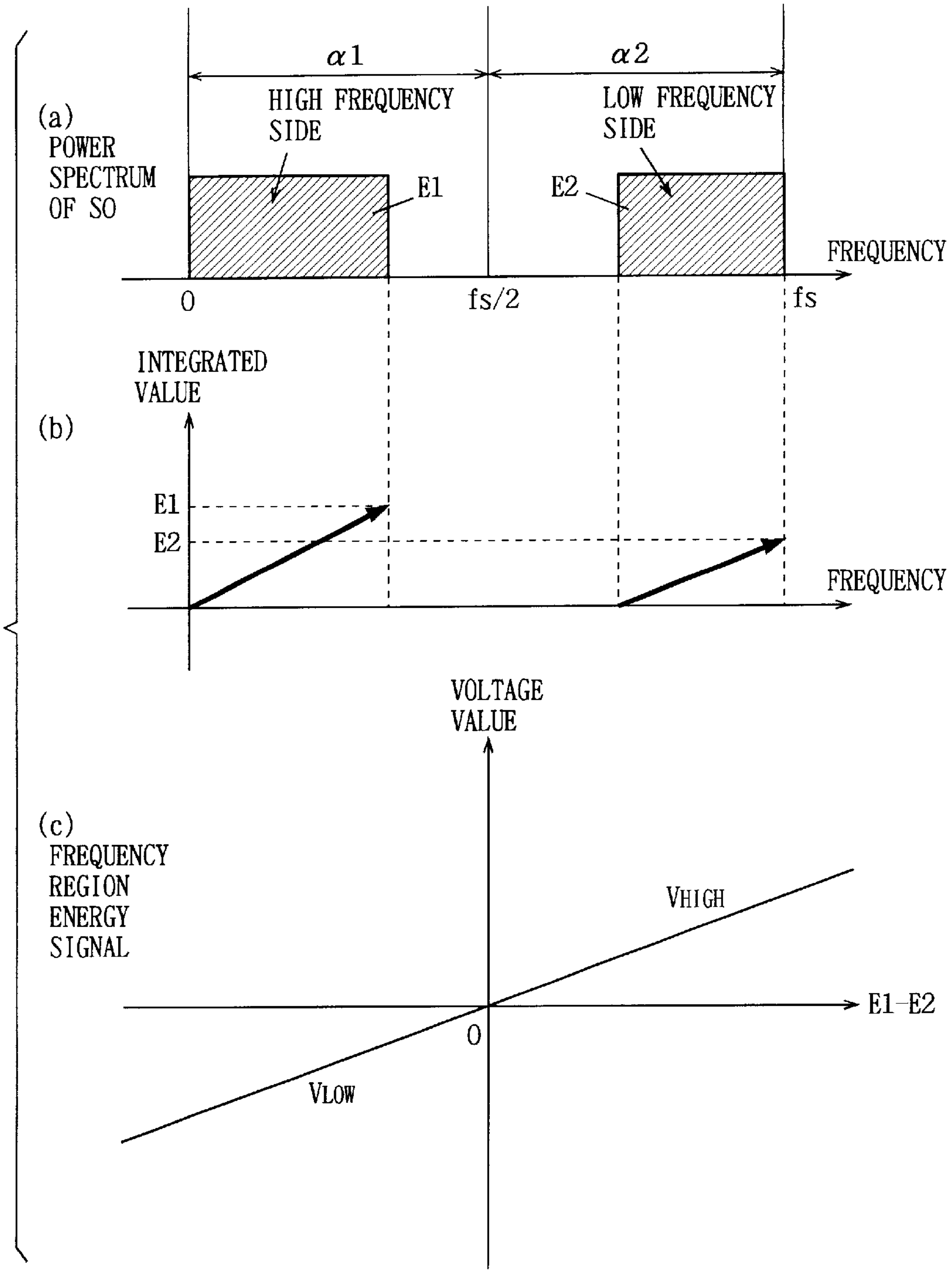
FIG. 8 is a waveform diagram for explaining the operation of a frequency region energy detector 71 shown in FIG. 7.

FIG. 8 is a waveform diagram for explaining the operation of the frequency region energy detector 71 shown in FIG. 7. Particularly, FIG. 8 (*a*) shows the power spectrum of a symbol S0 along the frequency axis, FIG. 8 (*b*) shows an integrated value of the power spectrum shown in FIG. 8 (*a*), and FIG. 8 (*c*) shows a frequency region energy signal. Referring to FIG. 8, the operations of the receiver shown in FIG. 7 will be described.

The frequency region energy detector 71 performs a sequence of operations as described below for each symbol in synchronization with a symbol synchronizing signal fed from a symbol timing synchronizing circuit 63 to a clock terminal 71*c*. First, the frequency region energy detector 71 divides carriers (which are amplitude-modulated by a binary pseudo random signal) distributed in a frequency range of 0 to fs in an output of a Fourier transformer 4 into two regions $\alpha$1 and $\alpha$2 using (½)fs as its boundary, as shown in FIG. 8 (*a*), where fs is the frequency of a sampling clock used in the Fourier transformer 4. Further, the spectrum of each of the symbols is folded using (½)fs as its boundary, whereby a high frequency component and a low frequency component respectively appear in the region $\alpha$1 whose frequency is lower than (½)fs and the region $\alpha$2 whose frequency is higher than (½)fs.

The frequency region energy detector 71 then squares and integrates a power spectrum component in the region $\alpha$1 and a power spectrum component in the region $\alpha$2, respectively, to find energy E1 in the region $\alpha$1 and energy E2 in the region $\alpha$2, as shown in FIG. 8 (*b*). The energy E1 and the energy E2 are proportional to the average level of each of the symbols. The power spectrum component is squared so as to find, because the amplitude of each of carriers varies on the positive and negative sides along the time axis, the absolute value thereof. In addition, the power spectrum component is integrated so as to find the average value thereof in each of the symbols.

The frequency region energy detector 71 then compares the energy El in the region $\alpha$1 and the energy E2 in the region $\alpha$2, to generate a frequency region energy signal having a voltage value corresponding to the difference in energy (E1-E2), as shown in FIG. 8 (*c*). The frequency region energy signal takes a positive voltage value VHIGH when the energy El in the region α1 is larger, while taking a negative value VLOW when the energy E2 in the region α2 is larger. In the symbol S0, when there is no shift in the frequency band, power distributions in the regions α1 and α2 are equal to each other, whereby the voltage value of the frequency region energy signal becomes zero. Consequently, the shift direction and the amount of shift from the center frequency fc are found on the basis of the polarity and the voltage value of the frequency region energy signal of the symbol S0.

A sample-and-hold device 66 samples and holds the frequency region energy signal outputted from the frequency region energy detector 71 when a reference timing signal at a voltage V1 is inputted from a reference timing generator 62 to a clock terminal 66*c,* that is, when the particular symbol S0 is outputted from a frequency converter 10. The frequency region energy signal held in the sample-and-hold device 66 is fed as a control signal to a control terminal 10*c* of the frequency converter 10. The amount of frequency shift of the frequency converter 10 varies depending on the voltage level of the control signal fed from the sample-and-hold device 66.

When the frequency band of the OFDM signal outputted from the frequency converter 10 is increased, the voltage value VHIGH of the frequency region energy signal of the symbol S0 outputted from the frequency region energy detector 71 is increased in the positive direction, whereby the voltage of the control signal fed to the frequency converter 10 is also increased in the positive direction. At this time, the frequency converter 10 increases the amount of frequency shift so as to decrease the frequency band of the outputted OFDM signal. On the other hand, when the frequency band of the OFDM signal is decreased, the voltage value VLOW of the frequency region energy signal of the symbol S0 is increased in the negative direction, whereby the voltage of the control signal fed to the frequency converter 10 is also increased in the negative direction. At this time, the frequency converter 10 decreases the amount of frequency shift so as to increase the frequency of the outputted OFDM signal. As a result, the frequency converter 10 can correct the variation in the frequency band of the OFDM signal in a suitable intermediate frequency band (its center frequency fc). The control signal sampled and held by the sample-and-hold device 66 may be averaged over a plurality of periods of the symbol S0.

As described in the foregoing, according to the third embodiment shown in FIG. 7, the particular symbol S0 is periodically detected by the reference timing generator 62, and the frequency region energy signal of the symbol S0 is sampled and held as a control signal and is fed back to the control terminal 10*c* of the frequency converter 10, whereby the precision of control of the amount of frequency shift of the frequency converter 10 can be improved. In addition, the variation in the frequency band is corrected by the control of the amount of frequency shift. Accordingly, there is no shift from the intermediate frequency band, whereby demodulated data can be prevented from being erroneously judged.

Figure 9:
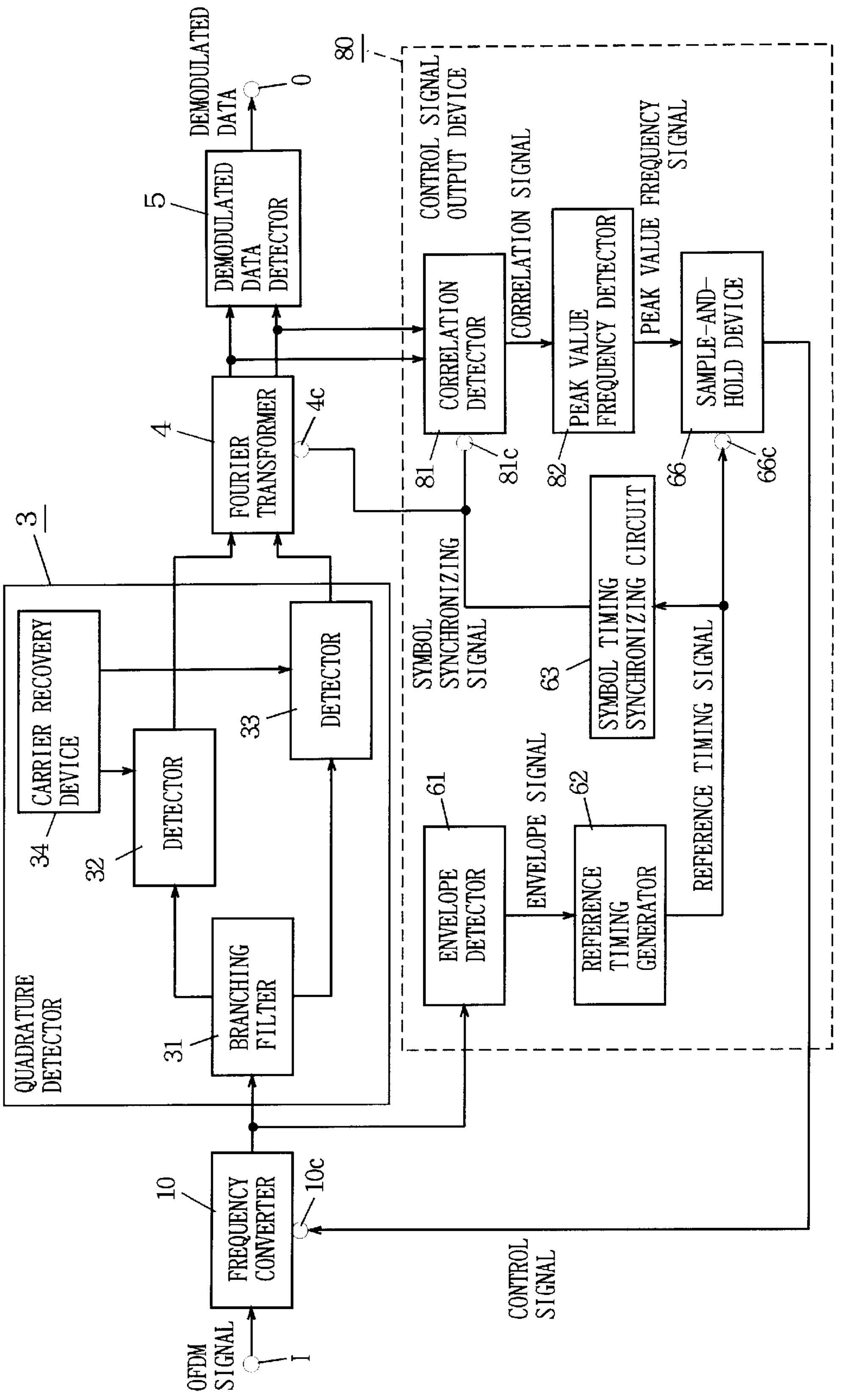
FIG. 9 is a block diagram showing the construction of a receiver according to a fourth embodiment of the present invention.

FIG. 9 is a block diagram showing the construction of a receiver according to a fourth embodiment of the present invention. Sections corresponding to the sections in the receiver shown in FIG. 5 are assigned the same reference numerals and hence, the description thereof is not repeated. It should be noted in the present embodiment that a correlation detector 81 and a peak value frequency detector 82 are used in place of the frequency discriminator 68 shown in FIG. 5, to construct a control signal output device 80.

Figure 10:
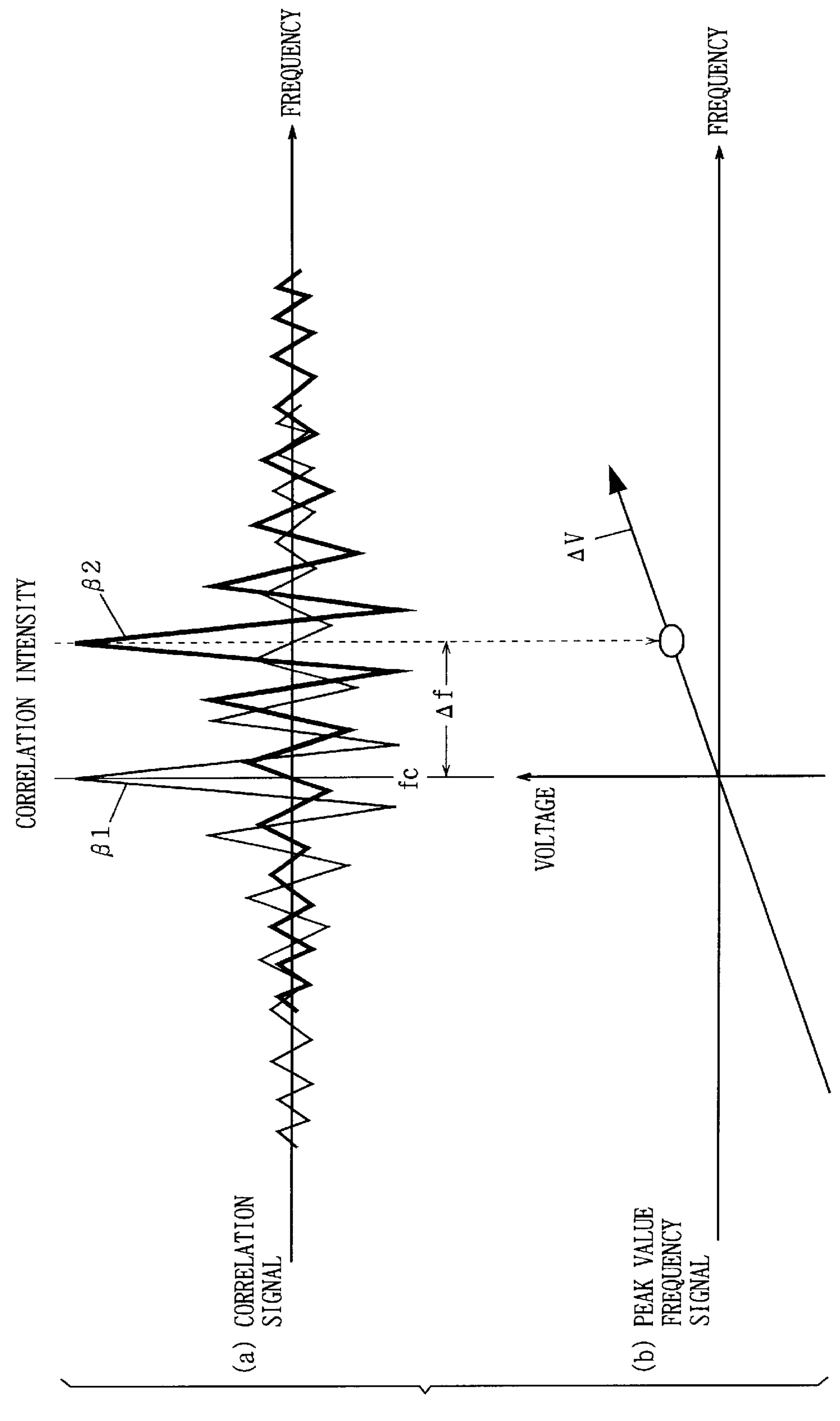
FIG. 10 is a waveform diagram showing signals in each section of a control signal output device 80 shown in FIG. 9.
Figure 11:
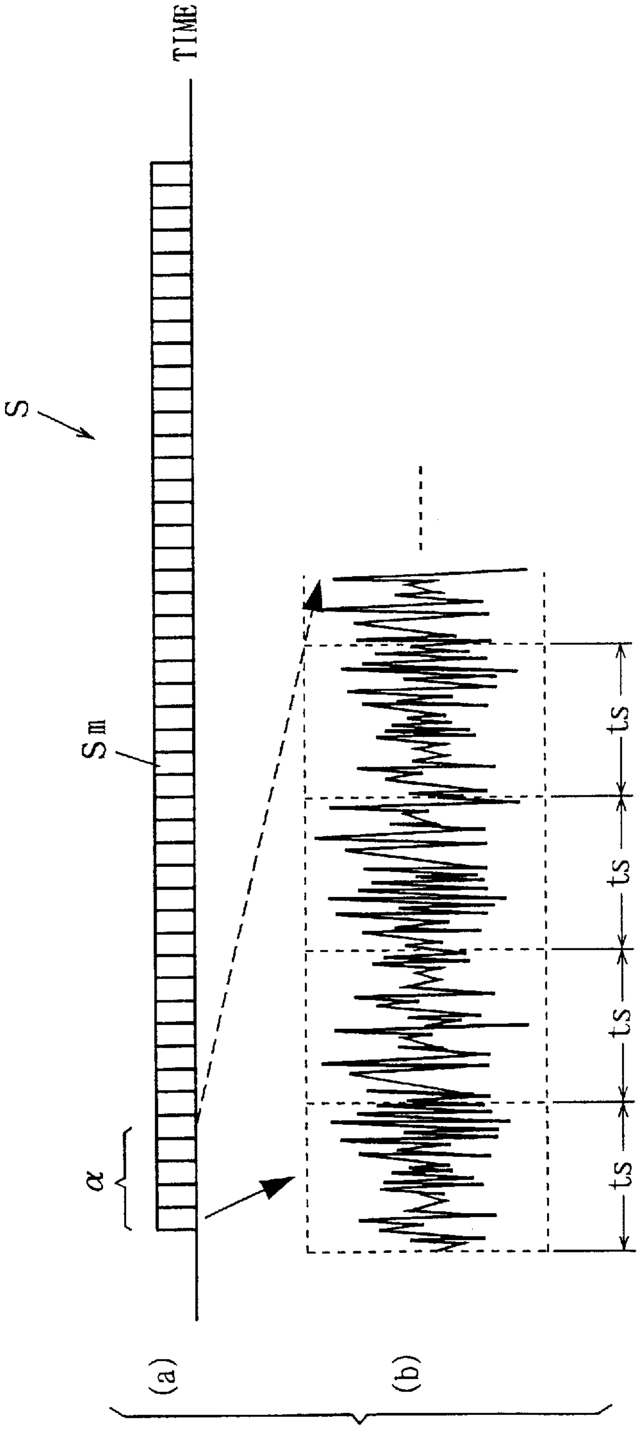
FIG. 11 is a diagram showing the structure of a conventional OFDM signal transmitted from the transmitting end.
Figure 12:
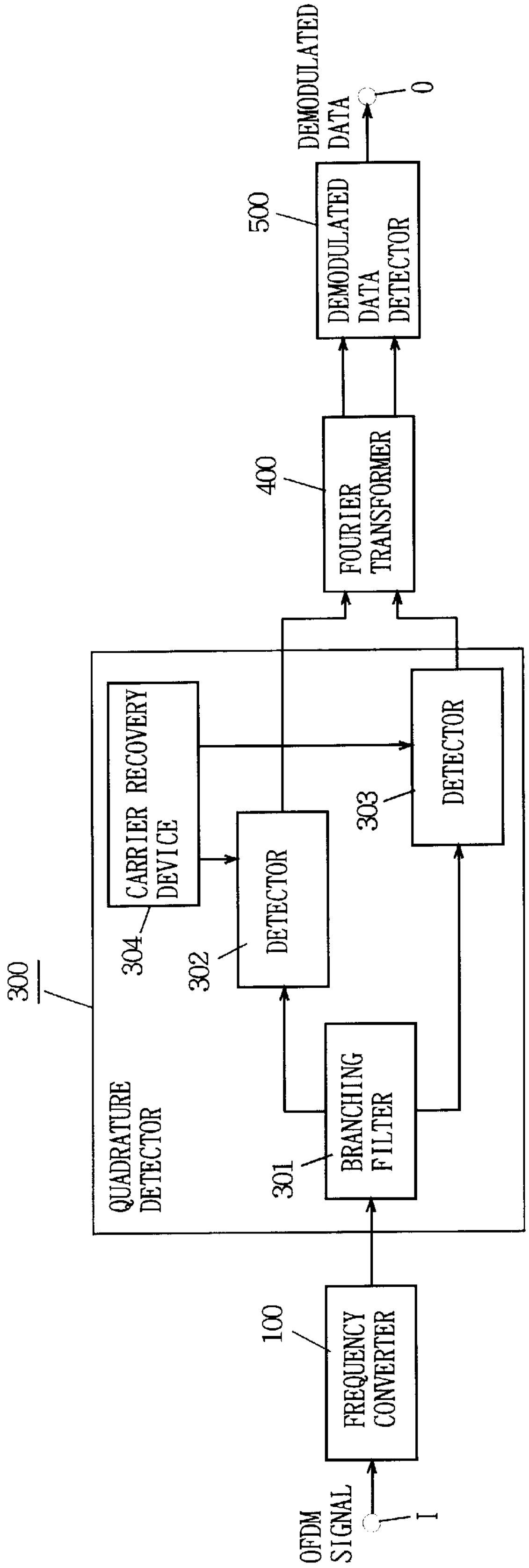
FIG. 12 is a block diagram showing the construction of a receiver of an OFDM signal which is analogized from the first prior art to the third prior art.

FIG. 10 is a waveform diagram showing signals in the each section of the control signal output device 80 shown in FIG. 9. Particularly, FIG. 10 (*a*) shows a correlation signal along the frequency axis, FIG. 10 (*b*) shows a peak value frequency signal. Referring now to FIG. 10, the operations of the receiver shown in FIG. 9 will be described.

The correlation detector 81 previously stores information of an ideal frequency component with respect to a particular symbol S0 as reference information. The correlation detector 81 finds the correlation between the reference information and data on the frequency axis outputted from a Fourier transformer 4, to output a correlation signal as shown in FIG. 10 (*a*). Although a correlation detecting operation in the correlation detector 81 is performed for each symbol in synchronization with a symbol synchronizing signal fed to a clock terminal 81*c* from a symbol timing synchronizing circuit 63, it has meaning particularly when the particular symbol S0 is outputted from the Fourier transformer 4. Therefore, description is made of a case where the particular symbol S0 is outputted from the Fourier transformer 4. In this case, the correlation detector 81 stores information with respect to the symbol S0 as information to be detected in an internal memory (not shown). Both the reference information previously stored in the correlation detector 81 and the information to be detected which is stored in the internal memory are digital pseudo random signals existing in a dispersion manner on the frequency axis. The correlation detector 81 superposes the information to be detected and the reference information on the frequency axis, multiplies code information included in the respective information, and finds the sum of the information. At this time, the correlation detector 81 finds the sum of the results of the multiplication between the information to be detected and the reference information while shifting the position of the information to be detected on the frequency axis for each code. The set of the sums becomes a correlation signal. The correlation signal exhibits a peak when respective correspondences between code information included in the information to be detected and code information included in the reference information coincide with each other on the frequency axis.

In a case where the symbol S0 is outputted from the Fourier transformer 4, when the shift in frequency Δf is "0", for example, the correlation detector 81 outputs a correlation signal having a peak value in the position of the center frequency fc, as indicated by β1 shown in FIG. 10 (*a*). Further, in a case where the symbol S0 is outputted, when the shift in frequency Δf occurs on the higher frequency side, for example, the correlation detector 81 outputs a correlation signal whose peak value is shifted and is produced on the higher frequency side on the frequency axis, as indicated by Δ2 shown in FIG. 10 (*a*). Consequently, the shift direction and the shift amount of the frequency can be detected from the correlation signal.

The peak value frequency detector 82 compares the place where the peak value of the correlation signal outputted from the correlation detector 81 exists and the center frequency fc, to output a peak value frequency signal (see FIG. 10 (*b*)) having a voltage value ΔV corresponding to the difference Δf.

A sample-and-hold device 66 samples and holds the peak value frequency signal outputted from the peak value frequency detector 82 when a reference timing signal at a voltage V1 is inputted from a reference timing generator 62 to a clock terminal 66*c,* that is, when the particular symbol S0 is outputted from a frequency converter 10. The peak value frequency signal held in the sample-and-hold device 66 is fed as a control signal to a control terminal 10*c* of the frequency converter 10. The amount of frequency shift of the frequency converter 10 varies depending on the voltage level of the control signal fed from the sample-and-hold device 66.

If the frequency band of the OFDM signal outputted from the frequency converter 10 is increased, the level ΔV of the peak value frequency signal of the symbol S0 outputted from the peak value frequency detector 82 is also increased in the positive direction, whereby the voltage level of the control signal fed to the frequency converter 10 is increased. At this time, the frequency converter 10 increases the amount of frequency shift so as to decrease the frequency band of the outputted OFDM signal. On the other hand, when the frequency of the OFDM signal is decreased, the level ΔV of the peak value frequency signal of the symbol S0 is increased in the negative direction, whereby the voltage level of the control signal fed to the frequency converter 10 is increased in the negative direction. At this time, the frequency converter 10 decreases the amount of frequency shift so as to increase the frequency band of the outputted OFDM signal. As a result, the frequency converter 10 can correct the variation in the frequency band of the OFDM signal in a suitable intermediate frequency band (its center frequency fc).

As described in the foregoing, according to the fourth embodiment shown in FIG. 9, the particular symbol S0 is periodically detected by the reference timing generator 62, and the peak value frequency signal of the symbol S0 is sampled and held as a control signal and is fed back to the control terminal 10*c* of the frequency converter 10, whereby the precision of control of the amount of frequency shift of the frequency converter 10 can be improved. In addition, the variation in the frequency band is corrected by the control of the amount of frequency shift. Accordingly, there is no shift from an intermediate frequency band, whereby demodulated data can be prevented from being erroneously judged.

Although in the above-mentioned second to fourth embodiments, the symbol S0 is inserted at intervals of 15 symbols, it may be inserted at the other intervals of symbols. Further, although in the above-mentioned second to fourth embodiments, each of the symbols S0 is constructed by amplitude-modulating only one carrier by a binary pseudo random code and suppressing the other carriers, the symbol S0 may be constructed by another method, provided that it is a signal whose time axis component and frequency axis component are known and whose amplitude and phase along the time axis are changed in predetermined particular patterns. For example, the symbol S0 may be constructed by a signal in which only one carrier is used as a non-modulated single tone signal and the other carriers are suppressed (see FIG. 1).

Although in the above-mentioned second to fourth embodiments, the OFDM signal in the intermediate frequency band outputted from the frequency converter 10 is inputted to the envelope detector 61 (further the frequency discriminator 68 in the second embodiment), an output of any one of the frequency converter 10 and the subsequent sections, that is, the frequency converter 10, the quadrature detector 3 and the Fourier transformer 4 may be inputted to the envelope detector 61 (and the frequency discriminator 68).

Furthermore, although in the third and fourth embodiments, the output of the Fourier transformer 4 is inputted to the frequency region energy detector 71 and the correlation detector 81, respectively, an output of either one of the frequency converter 10 and the subsequent section, that is, the frequency converter 10 and the quadrature detector 3 may be inputted to the frequency region energy detector 71 and the correlation detector 81.

Additionally, although the first embodiment is so constructed as to correct the variation in the receiving level, and the second to fourth embodiments are so constructed as to correct the variation in the frequency band, such a receiving circuit which can correct both the variation in the receiving level and the variation in the frequency band may be constructed by combining any one of the second to fourth embodiments with the first embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of transmitting an orthogonal frequency division multiplexing signal for each of a plurality of symbols having a predetermined length, from a transmitting end to a receiving end through a wire or radio transmission line, said method comprising:

the transmitting end continuously transmitting a first symbol which includes data to be transmitted, a multiplexing signal of the data randomly changing; and the transmitting end intermittently transmitting a second symbol having a predetermined particular pattern, every time a predetermined number of the first symbols are transmitted; and the receiving end demodulating data on the basis of the received first symbol; and the receiving end correcting the variation in a receiving level based on the received second symbol.

2. A receiver for receiving an orthogonal frequency division multiplexing signal transmitted for each of a plurality of symbols having a predetermined length, from a transmitting end through a wire or radio transmission line and demodulating data from the received orthogonal frequency division multiplexing signal, wherein a particular symbol having a predetermined particular pattern is intermittently inserted into the orthogonal frequency division multiplexing signal, said receiver comprising:

automatic gain control amplifying means having a control terminal and whose gain varies depending on a control signal inputted to said control terminal, for changing the level of the received orthogonal frequency division multiplexing signal; and control signal outputting means for detecting the particular symbol from the orthogonal frequency division multiplexing signal whose level has been changed by said automatic gain control amplifying means and generating a signal corresponding to the change in the level of the particular signal, wherein the signal generated by said control signal outputting means is fed back as the control signal to said automatic gain control amplifying means, to correct the variation in the receiving level of the orthogonal frequency division multiplexing signal.

3. The receiver according to claim 2, wherein said control signal outputting means comprises envelope detecting means for envelope-detecting each of said symbols, to output an envelope signal representing an envelope of the detected symbol, reference timing generating means for comparing a pattern of said envelope signal, for each symbol, with a particular pattern previously stored, to generate a reference timing signal indicating whether or not the particular symbol is detected, and sampling-and-holding means for sampling and holding as the control signal the envelope signal outputted from said envelope detecting means when the reference timing signal represents the detected state of the particular symbol.

4. The receiver according to claim 2, wherein said control signal outputting means comprises boundary detecting means for detecting a boundary between said symbols and outputting a symbol synchronizing signal representing the boundary, symbol energy detecting means for squaring and integrating a signal component of each of said symbols in one symbol period in synchronization with the symbol synchronizing signal, to output a symbol energy signal representing the energy of the symbol, particular symbol detecting means for determining whether or not the particular symbol is included in the received orthogonal frequency division multiplexing signal, and sampling-and-holding means for sampling and holding as the control signal the symbol energy signal outputted from said symbol energy detecting means when said particular symbol detecting means detects the particular symbol.

5. The receiver according to claim 2, further comprising Fourier transforming means for subjecting the orthogonal frequency division multiplexing signal whose level has been changed by said automatic gain control amplifying means to a Fourier transform operation for each symbol using a time window, to separate a plurality of carriers on the frequency axis, said control signal outputting means comprising envelope detecting means for envelope-detecting each of said symbols, to output an envelope signal representing an envelope of the detected symbol, reference timing generating means for comparing a pattern of said envelope signal, for each symbol, with a particular pattern previously stored, to generate a reference timing signal indicating whether or not the particular symbol is detected, symbol timing synchronizing means for outputting a symbol synchronizing signal representing a boundary between said symbols based on said reference timing signal and further generating a lock/unlock signal representing an unlocked state when the receiving is started, while representing a locked state after the operation of said Fourier transforming means is stabilized, symbol energy detecting means for squaring and integrating a signal component of each the plurality of carriers on the frequency axis in each of the symbols outputted from said Fourier transforming means in one symbol period in synchronization with said symbol synchronizing signal, to output a signal energy signal representing the energy of the symbol, control signal switching means for selecting said envelope signal when said lock/unlock signal is in the unlocked state, while selecting said symbol energy signal when said lock/unlock signal is in the locked state, and sampling-and-holding means for sampling and holding as the control signal the envelope signal or the symbol energy signal which is selected by said control signal switching means when said reference timing signal represents the detected state of the particular symbol.

6. The receiver according to claim 5, wherein said symbol energy detecting means obtains the energy of each of the symbols by a digital operation.

7. The receiver according to claim 2, wherein the particular symbol intermittently inserted into the orthogonal frequency division multiplexing signal includes a signal in which only one carrier is left as a non-modulated single tone signal and other carriers are suppressed.

8. The receiver according to claim 2, wherein the particular symbol intermittently inserted into the orthogonal frequency division multiplexing signal includes a signal in which only one carrier is modulated by predetermined data and other carriers are suppressed.

9. The receiver according to claim 8, wherein the particular symbol intermittently inserted into the orthogonal frequency division multiplexing signal includes a signal in which only one carrier is modulated by a pseudo random code and other carriers are suppressed.

10. The receiver according to claim 9, wherein the data rate of said pseudo random code is selected as integer multiples of the symbol rate of said orthogonal frequency division multiplexing signal.

11. A receiver for receiving an orthogonal frequency division multiplexing signal transmitted for each of a plurality of symbols having a predetermined length, from a transmitting end through a wire or radio transmission line and demodulating data from the received orthogonal frequency division multiplexing signal, wherein a particular symbol having a predetermined particular pattern is intermittently inserted into the orthogonal frequency division multiplexing signal, said receiver comprising:

frequency converting means having a control terminal and whose amount of frequency shift varies depending on a control signal inputted to the control terminal for changing the frequency band of said orthogonal frequency division multiplexing signal; and control signal outputting means for detecting the particular symbol from the orthogonal frequency division multiplexing signal whose frequency band has been changed by said frequency converting means and generating a signal corresponding to the change in the frequency band of the particular symbol.

wherein the signal generated by said control signal outputting means is fed back as the control signal to correct the variation in the frequency band of the orthogonal frequency division multiplexing signal; and wherein said control signal outputting means comprises envelope detecting means for envelope-detecting each of said symbols, to output and envelope signal representing an envelope of the detected symbol, reference timing generating means for comparing a pattern of said envelope signal, for each symbol, with a particular pattern previously stored, to generate a reference timing signal indicating whether or not the particular symbol is detected, frequency discriminating means for frequency-discriminating each of said symbols, to generate a frequency discriminating signal corresponding to the frequency of the symbol, and sampling-and-holding means for sampling and holding as the control signal the frequency discriminating signal outputted from said frequency discriminating means when the reference timing signal represents the detected state of the particular symbol.

12. A receiver for receiving an orthogonal frequency division multiplexing signal transmitted for each of a plurality of symbols having a predetermined length from a transmitting end through a wire or radio transmission line and demodulating data from the received orthogonal frequency division multiplexing signal, wherein a particular symbol having a predetermined particular pattern is intermittently inserted into the orthogonal frequency division multiplexing signal, said receiver comprising:

frequency converting means having a control terminal and whose amount of frequency shift varies depending on a control signal inputted to the control terminal, for changing the frequency band of said orthogonal frequency division multiplexing signal: and control signal outputting means for detecting the particular symbol from the orthogonal frequency division multiplexing signal whose frequency band has been changed by said frequency converting means and generating a signal corresponding to the change in the frequency band of the particular symbol, wherein the signal generated by said control signal outputting means is fed back as the control signal, to correct the variation in the frequency band of the orthogonal frequency division multiplexing signal; and wherein said control signal outputting means comprises envelope detecting means for envelope-detecting each of said symbols, to output and envelope signal representing an envelope of the detected symbol, reference timing generating means for comparing a pattern of said envelope signal, for each symbol, with a particular pattern previously stored, to generate a reference timing signal indicating whether or not the particular symbol is detected, frequency region energy detecting means for dividing a signal component on the frequency axis of each of said symbols into two regions having a predetermined center frequency as its boundary, comparing energy in the region having a frequency lower than the center frequency with energy in the region having a frequency higher than the center frequency, to generate a frequency region energy signal corresponding to the difference in energy between both the regions, and sampling-and-holding means for sampling and holding as the control signal the frequency region energy signal outputting from said frequency region energy detecting means when the reference timing signal represents the detected state of the particular symbol.

13. A receiver for receiving an orthogonal frequency division multiplexing signal transmitted for each of a plurality of symbols having a predetermined length, from a transmitting end through a wire or radio transmission line and demodulating data from the received orthogonal frequency division multiplexing signal, wherein a particular symbol having a predetermined particular pattern is intermittently inserted into the orthogonal frequency division multiplexing signal, said receiver comprising:

frequency converting means having a control terminal and whose amount of frequency shift varies depending on a control signal inputted to the control terminal, for changing the frequency band of said orthogonal frequency division multiplexing signal: and control signal outputting means for detecting the particular symbol from the orthogonal frequency division multiplexing signal whose frequency band has been changed by said frequency converting means and generating a signal corresponding to the change in the frequency band of the particular symbol, wherein the signal generated by said control signal outputting means is fed back as the control signal, to correct the variation in the frequency band of the orthogonal frequency division multiplexing signal; and wherein said control signal outputting means comprises envelope detecting means for envelope-detecting each of said symbols, to output and envelope signal representing an envelope of the detected symbol, reference timing generating means for comparing a pattern of said envelope signal, for each symbol, with a particular pattern previously stored, to generate a reference timing signal indicating whether or not the particular symbol is detected, correlation detecting means for outputting a correlation signal representing the correlation intensity between a frequency component of each of said symbols and a frequency component of the particular symbol previously stored and the shift from a predetermined center frequency, peak value frequency detecting means for detecting the frequency at which a peak value of the correlation intensity exists from the correlation signal outputted from said correlation detecting means and outputting a peak value frequency signal corresponding to the difference between the detected frequency and the predetermined center frequency, and sampling-and-holding means for sampling and holding as the control signal the peak value frequency signal outputted from said peak value frequency detecting means when said reference timing signal represents the detected state of the particular symbol.

14. A receiver for receiving an orthogonal frequency division multiplexing signal transmitted for each of a plurality of symbols having a predetermined length, from a transmitting end through a wire or radio transmission line and demodulating data from the received orthogonal frequency division multiplexing signal, wherein a particular symbol having a predetermined particular pattern is intermittently inserted into the orthogonal frequency division multiplexing signal, said receiver comprising:

frequency converting means having a control terminal and whose amount of frequency shift varies depending on a control signal inputted to the control terminal, for changing the frequency band of said orthogonal frequency division multiplexing signal; and control signal outputting means for detecting the particular symbol from the orthogonal frequency division multiplexing signal whose frequency band has been changed by said frequency converting means and generating a signal corresponding to the change in the frequency band of the particular symbol, wherein the signal generated by said control signal outputting means is fed back as the control signal, to correct the variation in the frequency band of the orthogonal frequency division multiplexing signal; and wherein the particular symbol intermittently inserted into the orthogonal frequency division multiplexing signal includes a signal in which only one carrier is left as a non-modulated single tone signal and other carriers are suppressed.

15. A receiver for receiving an orthogonal frequency division multiplexing signal transmitted for each of a plurality of symbols having a predetermined length, from a transmitting end through a wire or radio transmission line and demodulating data from the received orthogonal frequency division multiplexing signal, wherein a particular symbol having a predetermined particular pattern is intermittently inserted into the orthogonal frequency division multiplexing signal, said receiver comprising:

frequency converting means having a control terminal and whose amount of frequency shift varies depending on a control signal inputted to the control terminal, for changing the frequency band of said orthogonal frequency division multiplexing signal; and control signal outputting means for detecting the particular symbol from the orthogonal frequency division multiplexing signal whose frequency band has been changed by said frequency converting means and generating a signal corresponding to the change in the frequency band of the particular symbol, wherein the signal generated by said control signal outputting means is fed back as the control signal, to correct the variation in the frequency band of the orthogonal frequency division multiplexing signal; and wherein the particular symbol intermittently inserted into the orthogonal frequency division multiplexing signal includes a signal in which only one carrier is modulated by a pseudo random code and other carriers are suppressed.

16. The receiver according to claim 15, wherein the data rate of said pseudo random code is selected as integer multiples of the symbol rate of said orthogonal frequency division multiplexing signal.

* * * * *